US011046080B2

(12) United States Patent
Takabayashi et al.

(10) Patent No.: US 11,046,080 B2
(45) Date of Patent: Jun. 29, 2021

(54) RECORDING APPARATUS

(71) Applicant: SEIKO EPSON CORPORATION, Tokyo (JP)

(72) Inventors: Kazunori Takabayashi, Okaya (JP); Nobuhisa Nomoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/824,181

(22) Filed: Mar. 19, 2020

(65) Prior Publication Data
US 2020/0298574 A1  Sep. 24, 2020

(30) Foreign Application Priority Data

Mar. 22, 2019  (JP) .............................. JP2019-054303

(51) Int. Cl.
| *B41J 2/175* | (2006.01) |
| *B41J 2/155* | (2006.01) |
| *B41J 19/20* | (2006.01) |
| *B41J 25/34* | (2006.01) |
| *B41J 2/14*  | (2006.01) |
| *C09D 11/30* | (2014.01) |
| *H04N 1/04*  | (2006.01) |

(52) U.S. Cl.
CPC ................. *B41J 2/175* (2013.01); *B41J 2/14* (2013.01); *B41J 2/155* (2013.01); *B41J 2/1752* (2013.01); *B41J 2/17513* (2013.01); *B41J 19/202* (2013.01); *B41J 25/34* (2013.01); *C09D 11/30* (2013.01); *H04N 1/04* (2013.01)

(58) Field of Classification Search
CPC ..... B41J 2/14; B41J 2/155; B41J 2/175; B41J 2/17509; B41J 2/17513; B41J 2/1752; B41J 2/17553; B41J 2/17566; B41J 19/202; B41J 25/34; B41J 29/02; B41J 29/13; B41J 2002/17575; C09D 11/30; H04N 1/04
See application file for complete search history.

(56) References Cited

U.S. PATENT DOCUMENTS

2006/0139421 A1* 6/2006 Kitabatake ........... B41J 2/17546
347/86

FOREIGN PATENT DOCUMENTS

JP  2004-142325  5/2004

* cited by examiner

*Primary Examiner* — Anh T Vo
(74) *Attorney, Agent, or Firm* — Workman Nydegger

(57) ABSTRACT

A printer includes: a carriage that includes a recording head and is configured to move in a width direction intersecting a medium transport direction; a liquid storage unit that stores an ink supplied to the recording head, is mounted on the carriage, includes a filling port configured such that the ink is filled therethrough, and is formed of a light-transmissive material; a visual recognition unit that is provided in the liquid storage unit and is configured to visually recognize a position of a liquid level in the liquid storage unit; an illumination unit that emits a light beam; and a light guide unit that guides the light beam emitted from the illumination unit such that the light beam is applied to the visual recognition unit from a rear side, when the visual recognition unit faces a front side.

11 Claims, 22 Drawing Sheets

RECORDING APPARATUS

The present application is based on, and claims priority from JP Application Serial Number 2019-054303, filed Mar. 22, 2019, the disclosure of which is hereby incorporated by reference herein in its entirety.

BACKGROUND

1. Technical Field

The present disclosure relates to a recording apparatus that performs recording by ejecting a liquid onto a medium.

2. Related Art

An ink jet printer as an example of a recording apparatus includes a recording apparatus that performs recording by ejecting an ink as a liquid onto a medium and a liquid storage unit that stores the ink to be supplied to the recording head, in which the liquid storage unit is configured to be able to replenish the ink consumed by the recording.

As disclosed in JP-A-2004-142325, a part or the entirety of the liquid storage unit is formed of a material that can visually recognize a liquid level of the ink, so that a user can identify the residual amount of the ink at a glance. In a recording apparatus disclosed in JP-A-2004-142325, a lamp such as a fluorescent lamp is provided at an upper portion of an ink tank serving as the liquid storage unit, and the lamp emits a light beam, so that it is easy to see the residual amount of the ink in the liquid storage unit.

In JP-A-2004-142325, the lamp is provided on the rear side of an upper cover of an apparatus body. In order to make it easy to see the liquid level of the ink in the liquid storage unit, it is preferable that the light beam is applied from the rear side of a liquid viewing surface of the liquid storage unit. However, it may be difficult to dispose the lamp at such a position.

SUMMARY

A recording apparatus according to the present disclosure that solves the above problems includes: a recording head that performs recording by ejecting a liquid to a transported medium; a carriage that includes the recording head and is configured to move in a width direction intersecting a medium transport direction; a liquid storage unit that stores the liquid supplied to the recording head, is mounted on the carriage, includes a filling port configured such that the liquid is filled therethrough, and is formed of a light-transmissive material; a visual recognition unit that is provided in the liquid storage unit and is configured to visually recognize a position of a liquid level in the liquid storage unit; an illumination unit that emits a light beam; and a light guide unit that guides the light beam emitted from the illumination unit such that the light beam is applied to the visual recognition unit from a rear side, when the visual recognition unit faces a front side.

DESCRIPTION OF EXEMPLARY EMBODIMENTS

Figure 1:
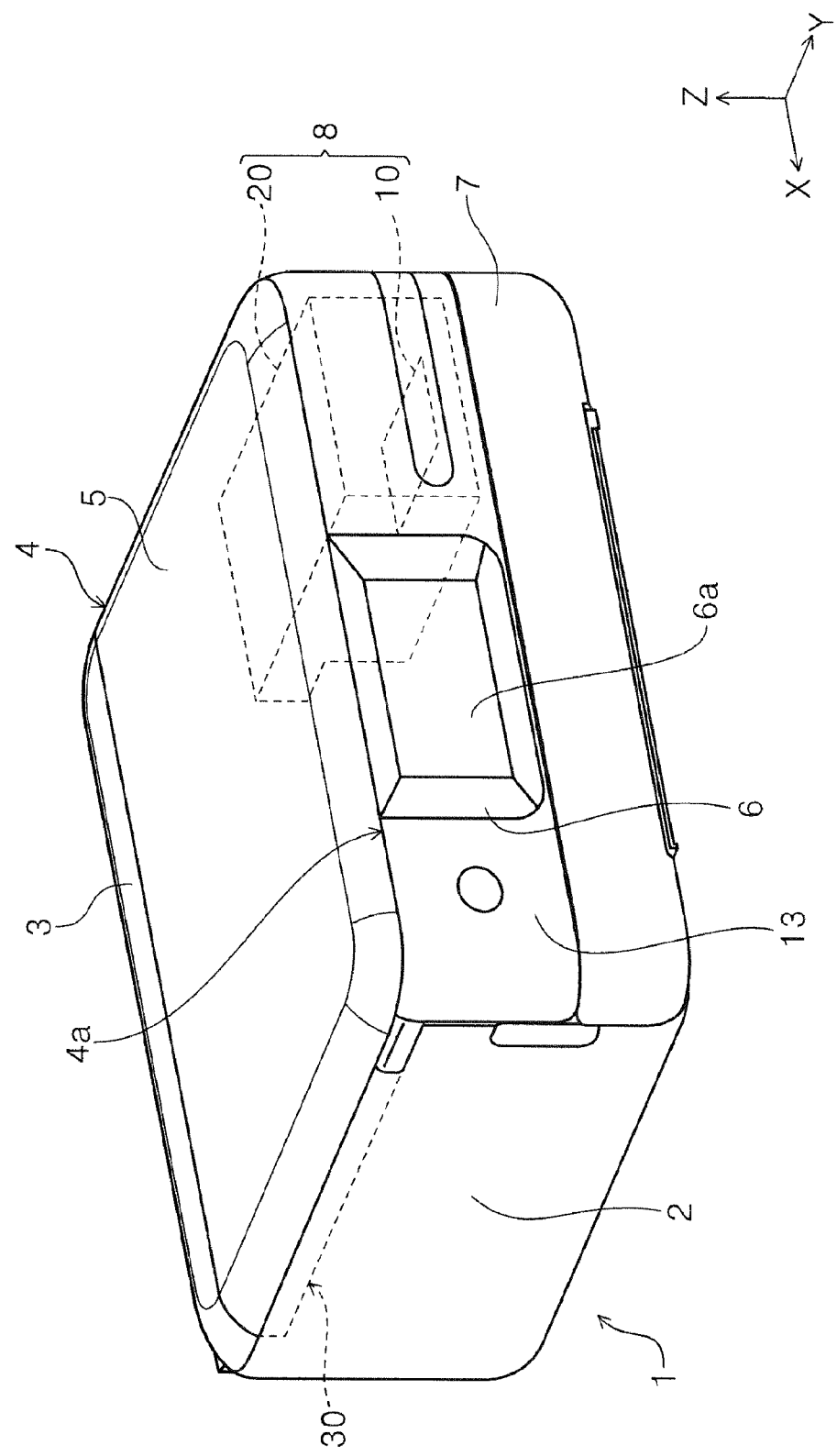
FIG. 1 is an external perspective view of a printer according to a first embodiment.

Hereinafter, the present disclosure will be schematically described.

A recording apparatus according to a first aspect includes: a recording head that performs recording by ejecting a liquid to a transported medium; a carriage that includes the recording head and is configured to move in a width direction intersecting a medium transport direction; a liquid storage unit that stores the liquid supplied to the recording head, is mounted on the carriage, includes a filling port configured such that the liquid is filled therethrough, and is formed of a light-transmissive material; a visual recognition unit that is provided in the liquid storage unit and is configured to visually recognize a position of a liquid level in the liquid storage unit; an illumination unit that emits a light beam; and a light guide unit that guides the light beam emitted from the illumination unit such that the light beam is applied to the visual recognition unit from a rear side, when the visual recognition unit faces a front side.

According to this aspect, since the light beam emitted from the illumination unit can be guided by the light guide unit and can be applied from the rear side of the visual recognition unit, the degree of freedom in designing arrangement of the illumination unit can be improved to obtain good visibility of the visual recognition unit.

A second aspect of the present disclosure provides the recording apparatus according to the first aspect, in which the illumination unit is provided vertically below the liquid storage unit.

According to this aspect, the illumination can be provided using a space below the liquid storage unit in the vertical direction.

A third aspect of the present disclosure provides the recording apparatus according to the first aspect, in which the illumination unit is provided on a lateral side of the liquid storage unit in the width direction.

According to this aspect, the illumination unit can be provided using a space on a lateral side of the liquid storage unit in the width direction.

A fourth aspect of the present disclosure provides the recording apparatus according to the first aspect to the third aspect, in which the liquid storage unit includes a plurality of liquid tanks including a front surface, a rear surface, side surfaces, a bottom surface, and a top surface, the light guide unit includes a plurality of light guide bodies provided behind the visual recognition units of the plurality of liquid tanks, respectively, and the illumination unit includes a plurality of light sources that introduce the light beam to the plurality of light guide bodies, respectively.

According to this aspect, when the liquid storage unit includes the plurality of liquid tanks, an individual light source and an individual light guide body are provided in each of the liquid tanks. Thus, for example, the light beam is applied only to a liquid tank that needs to be replenished with the liquid, so that the residual amount of the liquid can be easily visually recognized.

A fifth aspect of the present disclosure provides the recording apparatus according to the first aspect to the third aspect, in which the liquid storage unit includes a plurality of liquid tanks including a front surface, a rear surface, side surfaces, a bottom surface, and a top surface, the light guide unit includes a plurality of light guide bodies provided behind the visual recognition units of the plurality of liquid tanks, respectively, the illumination unit includes one light source of which the position is fixed, and the carriage is moved in the width direction so that the light beam is introduced from the one light source to one of the plurality of light guide bodies.

According to this aspect, the light beam can be introduced into only one of the plurality of light guide bodies by one light source, and the residual amount of the liquid of one of the plurality of liquid tanks can be prominently easily visually recognized.

A sixth aspect of the present disclosure provides the recording apparatus according to the first aspect to the third aspect, in which the liquid storage unit includes a front surface, a rear surface, side surfaces, a bottom surface, and a top surface, and includes a plurality of liquid tanks arranged side by side in the width direction, the illumination unit includes one light source, the light guide unit includes one light guide body that guides the light beam emitted from the one light source, and the light guide body is disposed to overlap the plurality of liquid tanks in the width direction.

According to this aspect, the light beam is applied to the plurality of liquid tanks by one light source and one light guide body, so that the residual amount of the liquid can be easily visually recognized.

A seventh aspect of the present disclosure provides the recording apparatus according to the fourth aspect to the sixth aspect, in which the plurality of liquid tanks include slits configured such that the light guide unit is disposed between the front surface and the rear surface.

According to this aspect, the plurality of liquid tanks include the slits in which the light guide unit can be disposed between the front surface and the rear surface. Thus, for example, the light beam can be guided at a position closer to the visual recognition unit than when the light beam is applied from the rear side of the rear surfaces of the liquid tanks. Therefore, visibility of the position of the liquid level of the liquid in the liquid tanks can be improved.

An eighth aspect of the present disclosure provides the recording apparatus according to the fourth aspect to the sixth aspect, in which the light guide unit is provided inside the liquid tank.

According to this aspect, the light guide unit is provided inside the liquid tank. Thus, for example, the light beam can be guided at a position closer to the visual recognition unit than when the light beam is applied from the rear side of the rear surface of the liquid tank. Therefore, visibility of the position of the liquid level of the liquid in the liquid tanks can be improved.

A ninth aspect of the present disclosure provides the recording apparatus according to the first aspect to the eighth aspect, further including: a housing including a movement area of the carriage therein; and a scanner unit that includes a document stand on which a document is placed and a reading unit that reads the document placed on the document stand, is provided to be rotatable with respect to the housing, and is configured to open and close an upper portion of the housing through rotation, in which the illumination unit is turned off when the scanner unit is in a closed state in which the scanner unit is closed with respect to the housing and is turned on when the scanner unit is opened from the closed state.

According to this aspect, when the scanner unit is opened, the residual amount of the liquid in the liquid storage unit can be easily visually recognized.

A tenth aspect of the present disclosure provides the recording apparatus according to the ninth aspect, further including a panel unit that is provided in the scanner unit and is configured to be tilted between a first posture and a second posture in which the panel unit is more parallel to the document stand than the first posture, in which the illumination unit is turned off when the panel unit is in the first posture and is turned on when the panel unit is tilted from the first posture to the second posture.

According to this aspect, since the illumination unit is turned on when the panel unit is tilted from the first posture to the second posture, the residual amount of the liquid in the liquid storage unit can be easily visually recognized. Further, the illumination unit is turned off when the panel unit is in the first posture, so that power consumption can be suppressed.

An eleventh aspect of the present disclosure provides the recording apparatus according to the ninth aspect or the tenth aspect, in which in a state in which the scanner unit is opened, the liquid storage unit is configured to be replenished with the liquid.

According to this aspect, when the liquid storage unit is replenished with the liquid, the residual amount of the liquid in the liquid storage unit can be visually recognized.

First Embodiment

Hereinafter, an outline of a recording apparatus according to an embodiment of the present disclosure will be described with reference to the drawings. In the present embodiment, an ink jet printer 1 is described as an example of the recording apparatus. Hereinafter, the ink jet printer 1 is simply referred to as a printer 1.

In an XYZ coordinate system illustrated in each drawing, an X-axis direction indicates an apparatus width direction, a Y-axis direction indicates an apparatus depth direction, and a Z-axis direction indicates an apparatus height direction. Further, the +Y direction indicates a forward direction with respect to the apparatus, and the −Y direction indicates a rearward direction with respect to the apparatus. Further, when viewed from the forward direction with respect to the apparatus, a leftward direction indicates the +X direction, and a rightward direction indicates the −X direction. Further, the +Z direction indicates an upward direction, and the −Z direction indicates a downward direction.

Further, in the printer 1, a transport direction in which a medium is transported is referred to as a "downstream direction", and a direction that is opposite thereto is referred to as an "upstream direction".

Outline of Printer

The printer 1 illustrated in FIG. 1 includes a housing 2 that has a movement area of a carriage 20 therein, which will be described below, and a scanner unit 4 that is provided on the housing 2 and reads an image of a document. That is, the printer 1 is configured as a multi-function machine having an image reading function in addition to a recording function.

In the printer 1, examples of the medium on which the recording is performed include, in addition to a plain paper, a thick paper that is thicker than the plain paper, such as a postcard and a business card, a thin paper that is thinner than the plain paper, a glossy paper for photography, and the like. Further, the printer 1 is configured to also perform the recording on a label surface of a disc-type memory such as a CD and a DVD.

The printer 1 includes a recording unit 8 that includes a recording head 10 that performs recording on a transported medium P by ejecting an ink as a liquid and a carriage 20 that supports the recording head 10, and is configured to perform the recording by ejecting the ink toward the medium P from the recording head 10. The carriage 20 is configured to reciprocate in a width direction (an X axis direction) intersecting a Y axis direction along a medium transport direction when the recording is performed.

Figure 3:
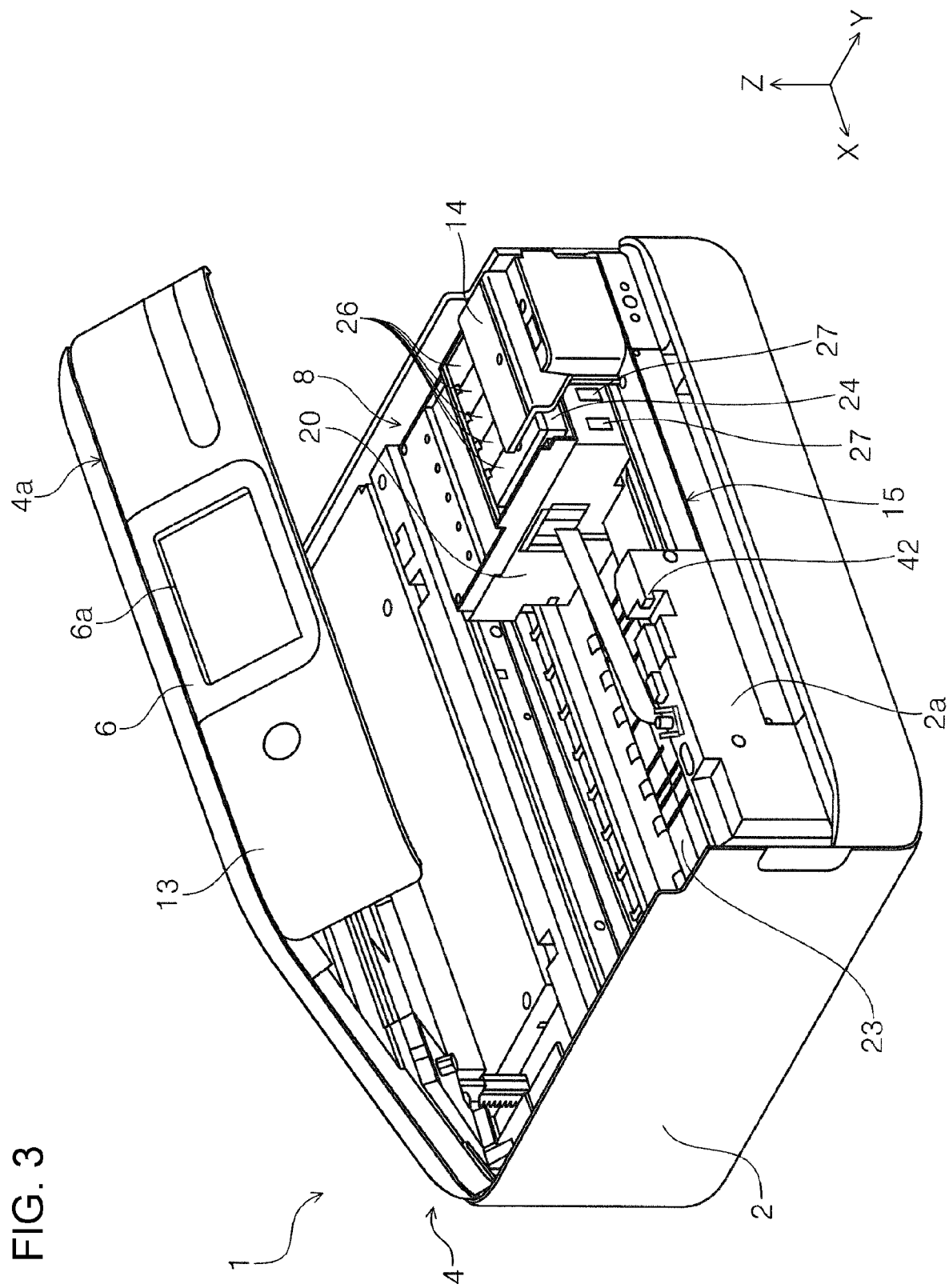
FIG. 3 is a perspective view illustrating a state in which a scanner unit is completely opened in the printer according to the first embodiment.

The scanner unit 4 is provided to be rotatable with respect to the housing 2 and is configured to be able to open and close an upper portion of the housing 2 through rotation. FIG. 1 illustrates a closed state in which the scanner unit 4 is closed with respect to the housing 2, and FIG. 3 illustrates an opened state in which the scanner unit 4 is completely opened with respect to the housing 2.

In FIG. 1, a panel unit 13 including a manipulation unit 6 is provided in the +Y direction that is the forward direction of the printer 1. The manipulation unit 6 can perform preview display of setting contents or an image in addition to various setting manipulations and execution manipulations for recording and image reading.

Figure 2:
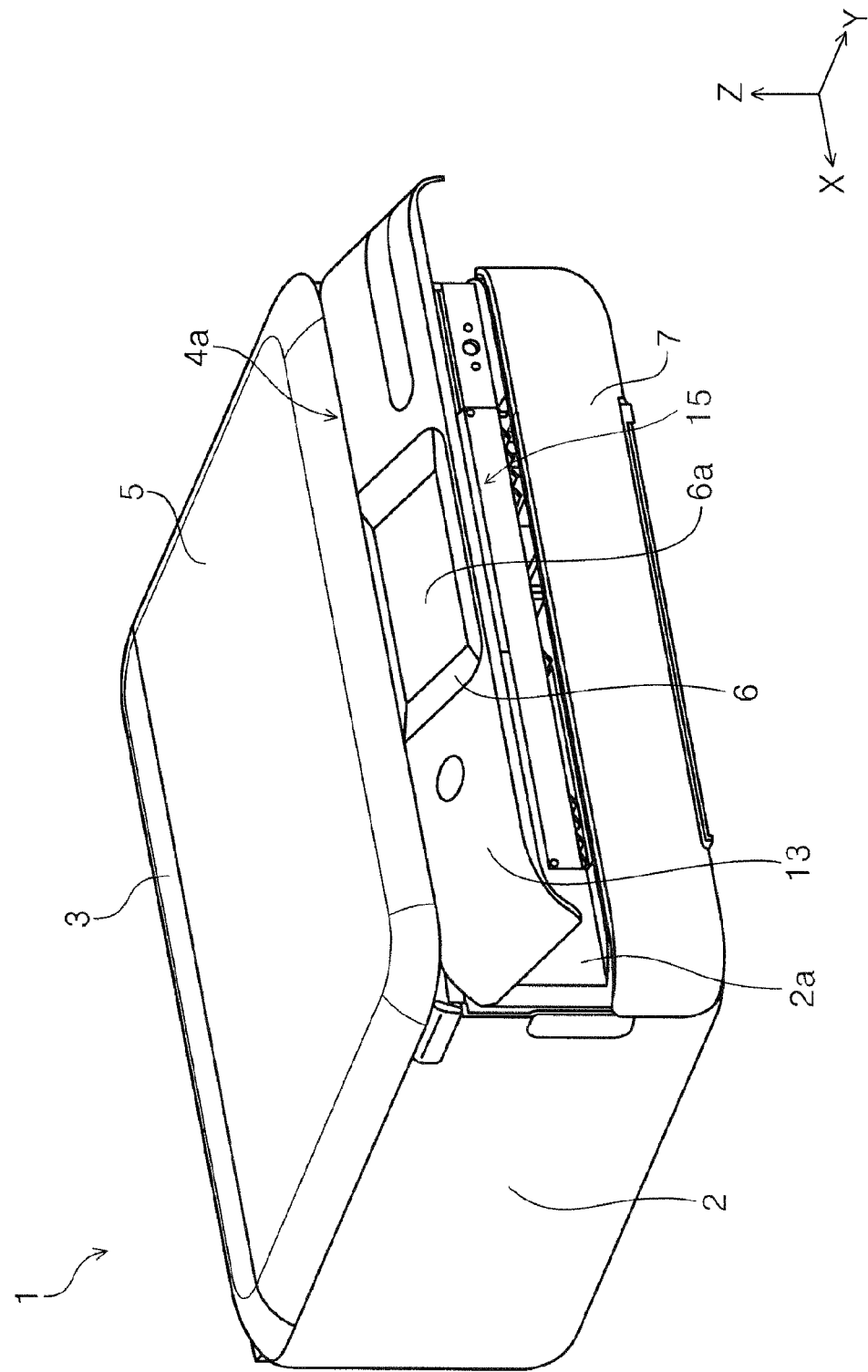
FIG. 2 is a perspective view illustrating a state in which a panel unit is in a tilted posture in a printer according to a first embodiment.

The panel unit 13 is provided in the scanner unit 4, and is tilted from a state in which a manipulation surface 6a as a panel surface faces the front side as illustrated in FIG. 1 to a state in which the manipulation surface 6a faces the upper side from the state of FIG. 1 as illustrated in FIG. 2.

Configurations of the scanner unit 4 and the panel unit 13 will be described in detail later.

A lower cover 7 is provided at a lower portion of a front surface 2a of the housing 2. The front surface 2a of the housing 2 is not visible in FIG. 1 but is illustrated in FIGS. 2 and 3.

Figure 5:
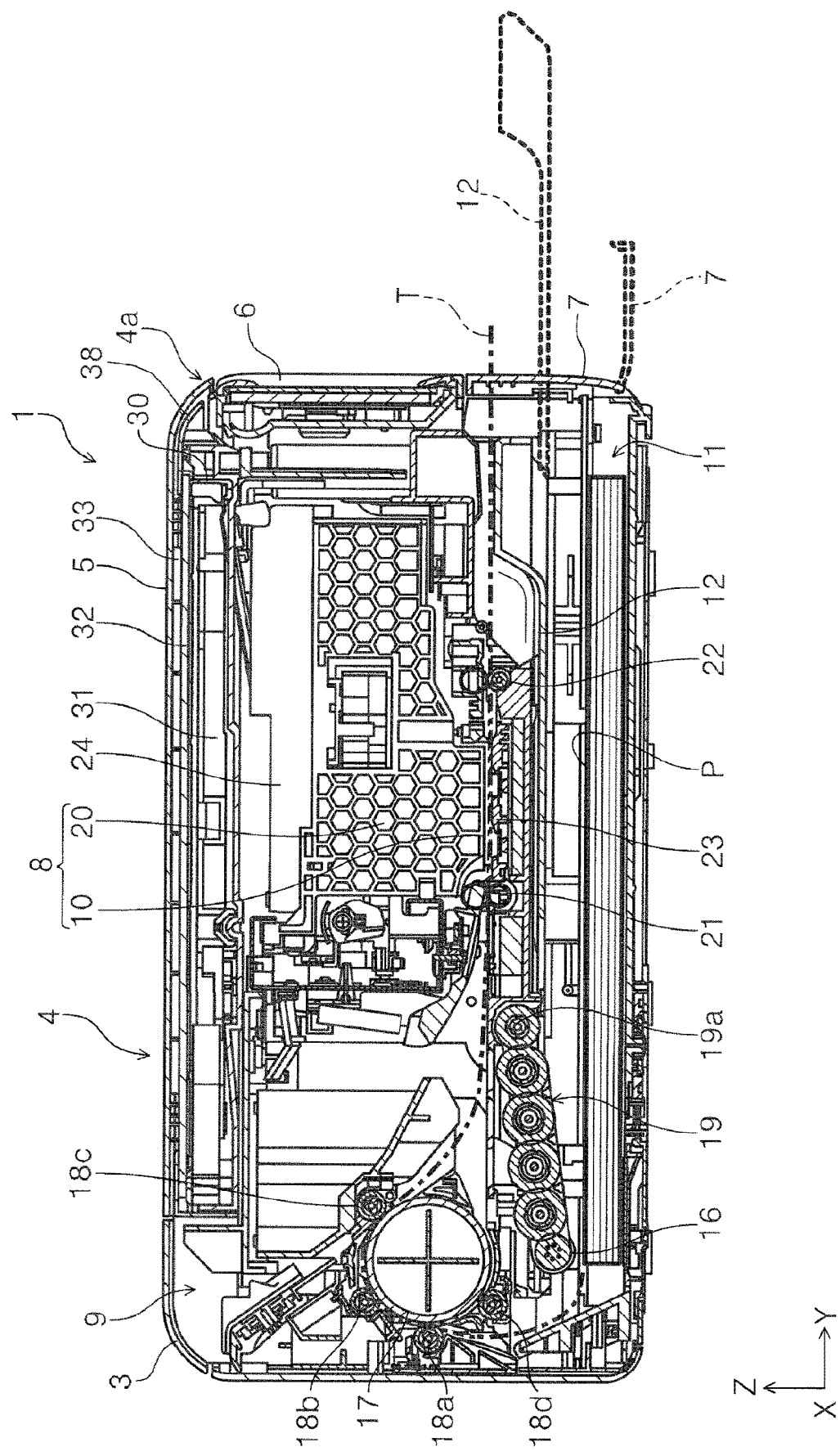
FIG. 5 is a side sectional view of the printer according to the first embodiment.

By opening the lower cover 7 as indicated by a dotted line in FIG. 5, a medium tray 11 for storing the medium P before the recording and a discharge tray 12 for receiving the medium P discharged after the recording are exposed.

The discharge tray 12 can be switched between a storage state in which the discharge tray 12 is stored in the housing 2 as indicated by a solid line in FIG. 5 and a protrusion state in which the discharge tray 12 protrudes toward the front side of the housing 2 as indicated by a dotted line in FIG. 5, and can receive the medium P after recording in the protrusion state. The discharge tray 12 is configured to be switchable between the storage state and the protrusion state by a motor that is not illustrated.

The medium tray 11 can store a plurality of media P, and is detachable from the housing 2. As illustrated in FIG. 5, the medium tray 11 can send the medium P to a medium transport path T, which will be described below, while being mounted on the housing 2. Further, the medium tray 11 can be replenished with the medium P while being pulled out forward (in the +Y direction).

In Medium Transport Path in Printer

Next, the medium transport path T of the printer 1 will be described with reference to FIG. 5. The medium transport path T is a transport path for the medium P transported from the medium tray 11 provided at a lower portion of the printer 1 toward a recording area by the recording unit 8.

The medium P set on the medium tray 11 is picked up by the feeding roller 16 and is sent out to the medium transport path T. In more detail, the feeding roller 16 that is rotationally driven by the drive source that is not illustrated is provided in a roller support member 19 that swings about a swing shaft 19a, rotates while being in contact with the uppermost medium P of the plurality of media P stored in the medium tray 11, and sends out the uppermost medium P from the medium tray 11 in the rearward direction with respect to the apparatus (in the −Y direction).

An intermediate roller 17 that is rotationally driven by the drive source that is not illustrated is provided downstream of the feeding roller 16, and the medium P is curved and reversed by the intermediate roller 17, and is sent in the forward direction with respect to the apparatus (in the +Y direction). Reference numerals 18a, 18b, 18c, and 18d are driven rollers that can be driven and rotated by the intermediate roller 17, and the medium is nipped by the driven roller 18a and the intermediate roller 17, is nipped by the driven roller 18b and the intermediate roller 17, is then nipped by the driven roller 18c and the intermediate roller 17, and is sent downstream. The driven roller 18d will be described later.

A transport roller pair 21 is provided downstream of the intermediate roller 17, and the medium P is sent to a lower side of the recording head 10 by the transport roller pair 21. In FIG. 5, in the transport roller pair 21, a lower roller is rotationally driven by the drive source that is not illustrated, and an upper roller is driven and rotated by the lower roller.

The recording unit 8 is provided downstream of the transport roller pair 21. In the recording unit 8, the recording head 10 that ejects the ink is provided at the bottom of the carriage 20. A liquid storage unit 24 for storing the ink supplied to the recording head 10 is mounted on the carriage 20.

The carriage 20 is configured to reciprocate in the width direction (the X axis direction) by a drive source that is not illustrated. The liquid storage unit 24 will be described below in more detail.

A medium support member 23 that supports a medium transported through the medium transport path T is provided at a position facing the recording head 10, and an interval between the medium and the recording head 10 is defined by the medium support member 23. The interval between the medium and the recording head 10 is also referred to as a gap.

A discharge roller pair 22 is provided downstream of the medium support member 23. Similar to the transport roller pair 21, the discharge roller pair 22 is also configured such that a lower roller is rotationally driven by the drive source that is not illustrated, and an upper roller is driven and rotated by the lower roller. The medium P after recording by the recording unit 8 is discharged toward the discharge tray 12 in the protrusion state by the discharge roller pair 22, as indicated by a dotted line in FIG. 5.

The printer 1 is configured to be able to perform double-sided recording in which recording is performed on a first surface of the medium P and a second surface opposite to the first surface. When performing the double-sided recording, after the recording on the first surface, the medium P is switched back and is sent in the −Y direction. The switched-back medium P can be nipped by the driven roller 18d and the intermediate roller 17 and can be joined to the medium transport path T. The medium P is reversed by the intermediate roller 17 and is transported to the lower side of the recording head 10 in a state in which the second surface faces the recording head 10, and the recording is performed on the second surface.

Further, the printer 1 is configured to be able to supply the medium P, on which the recording is performed, also from an upper supply port 9 provided at an upper portion in the rearward direction with respect to the apparatus. The upper supply port 9 is opened by opening a feeding port cover 3. The medium P supplied from the upper supply port 9 enters the medium transport path T upstream of the transport roller pair 21, and the recording on the medium P is performed by the recording head 10.

In Scanner Unit

In the printer 1, as illustrated in FIG. 3, the scanner unit 4 is provided to be rotatable with respect to the housing 2. The scanner unit 4 has a rotary shaft in the rearward direction of the apparatus, that is, in the −Y direction, and is configured to be able to open and close an upper portion of the housing 2 by rotating with a front side of the apparatus, that is, the +Y direction, as a free end 4a.

Figure 6:
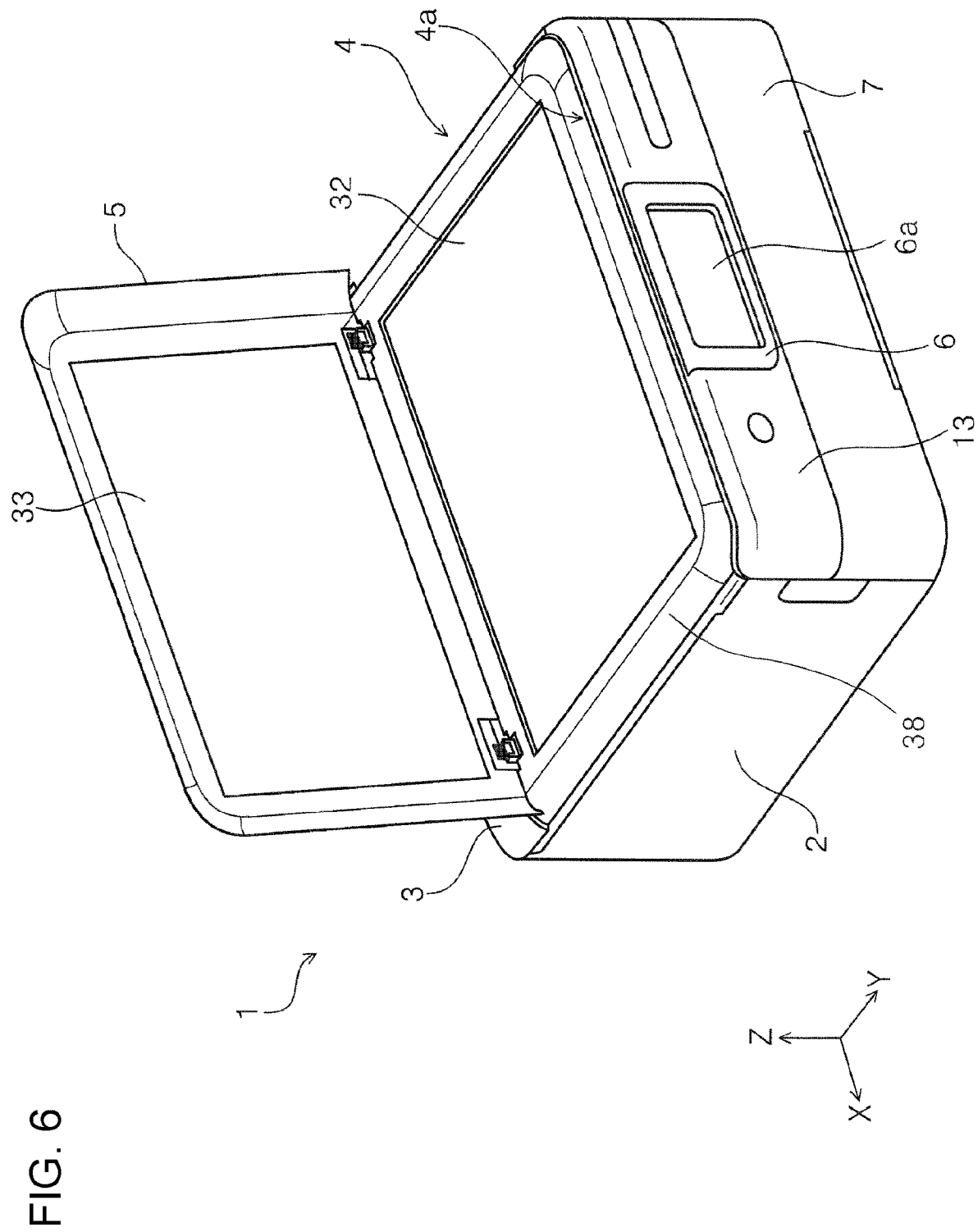
FIG. 6 is a perspective view illustrating a state in which a document stand cover of the scanner unit in the printer is opened according to the first embodiment.

As illustrated in FIG. 5, the scanner unit 4 includes a scanner body 30 including a reading section 31 therein serving as a reading unit for reading a document and a document stand cover 5 that can open and close a document stand 32 provided on the scanner body 30. When the document stand cover 5 is opened as illustrated in FIG. 6, the document stand 32 is exposed. The reading section 31 reads a document placed on the document stand 32. The document is placed on the document stand 32 in a state in which a reading surface faces the document stand 32.

In the scanner unit 4, the document stand 32 is disposed on the scanner body 30 as illustrated in FIGS. 5 and 6, and the outer periphery of four sides is pressed by a frame member 38.

When the document stand cover 5 is closed, as illustrated in FIG. 6, a presser plate 33 that presses the document is provided on a surface facing the document stand 32.

The panel unit 13 is provided in the scanner body 30, and the document stand cover 5 can be opened and closed alone.

In Panel Unit

As described above, the panel unit 13 is provided to be rotatable with respect to the scanner body 30 of the scanner unit 4.

As illustrated in FIG. 3, a notch portion 15 is provided on the front surface 2a of the housing 2, and the panel unit 13 is configured to be tiltable between a first posture illustrated in FIG. 1 and a second posture in which the panel unit 13 is more parallel to the document stand 32 (see FIG. 6) than the first posture as illustrated in FIG. 2. In the first posture of the panel unit 13 illustrated in FIG. 1, the notch portion 15 (see FIG. 3) is covered with the panel unit 13. In the second posture of the panel unit 13 illustrated in FIG. 2, the notch portion 15 is opened.

In the present embodiment, the panel unit 13 is configured to be tiltable up to 80° in a direction in which the manipulation surface 6a faces the upper side while a state of the first posture illustrated in FIG. 1 is set as 0°. In the second posture illustrated in FIG. 2, a state in which the panel unit 13 is tilted at an inclination angle of 80° is illustrated.

Further, in the printer 1, the panel unit 13 is provided at the free end 4a of the scanner unit 4. Accordingly, a rotation direction of the scanner unit 4 and a rotation direction of the panel unit 13 are the same, and operability of the printer 1 in a state in which the user looks at the panel unit 13 from the front side is improved.

In Liquid Storage Unit

In the printer 1, the liquid storage unit 24 mounted on the carriage 20 illustrated in FIG. 3 can be replenished from a replenishment container 28 with the ink that has been reduced by the recording.

The printer 1 is configured such that the ink can be replenished in the liquid storage unit 24 in a state in which the scanner unit 4 is opened as illustrated in FIG. 3.

Figure 4:
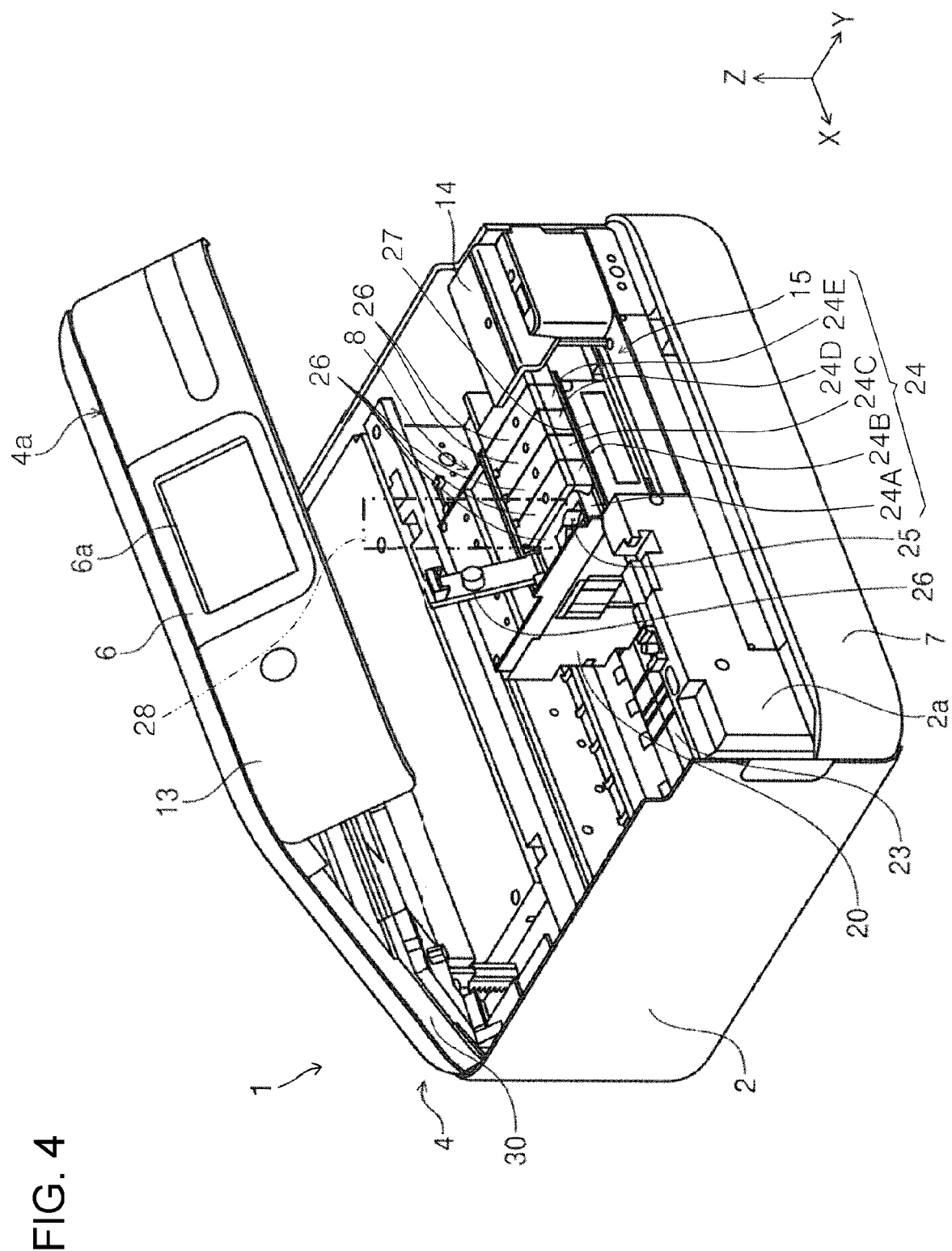
FIG. 4 is a perspective view illustrating a state in which the scanner unit is completely opened and a carriage is moved a position where a liquid storage unit is replenished with an ink, in the printer according to the first embodiment.

As illustrated in FIG. 3, the liquid storage unit 24 mounted on the carriage 20 includes ink tanks 24A, 24B, 24C, 24D, and 24E that are a plurality of liquid tanks corresponding to a plurality of colors. Caps 26 that close filling ports 25 illustrated in FIG. 4 are provided at upper portions of the ink tanks 24A, 24B, 24C, 24D, and 24E. FIG. 4 illustrates a state in which the cap 26 of the leftmost ink tank 24A is opened when the drawing is viewed from the front side. The cap 26 opens and closes the filling port 25 by rotating about the rearward direction with respect to the apparatus (the −Y direction). The replenishment container 28 can be inserted into the filling port 25 to fill the ink into the liquid storage unit 24.

Figure 7:
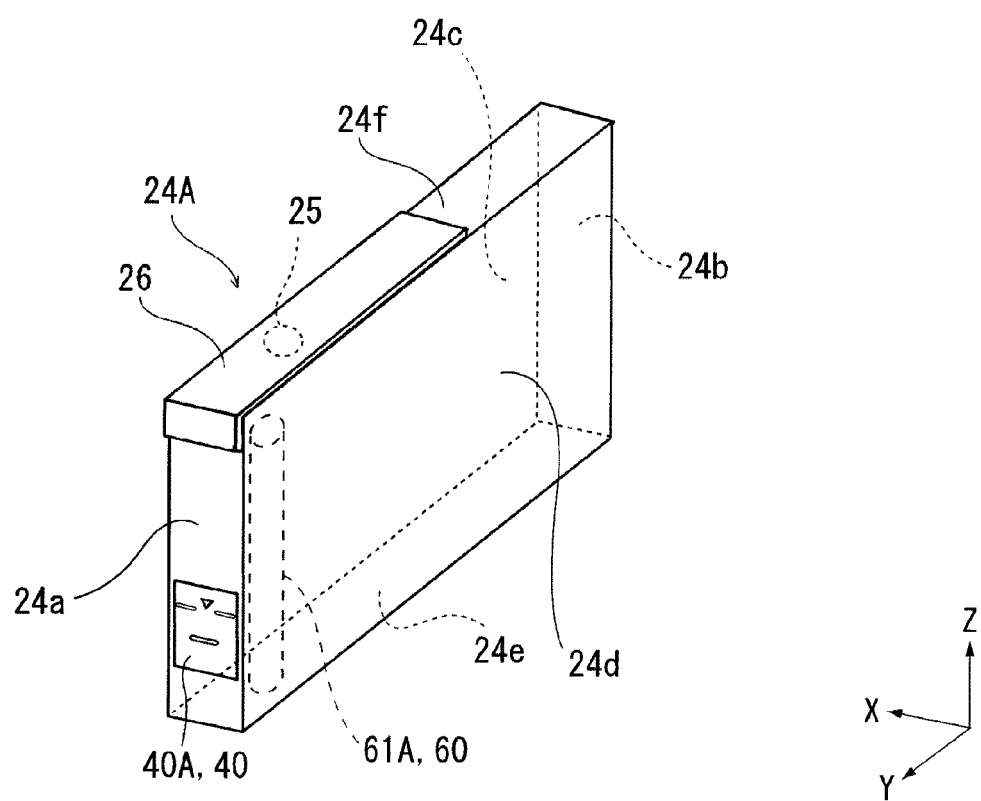
FIG. 7 is a schematic perspective view of an ink tank constituting the liquid storage unit.

As illustrated in FIG. 7, each of the ink tanks 24A, 24B, 24C, 24D, and 24E includes a front surface 24a, a rear surface 24b, side surfaces 24c and 24d, a bottom surface 24e, and a top surface 24f. The front surface 24a is a surface facing the +Y direction that is the forward direction of the apparatus. Although the ink tank 24A is illustrated in FIG. 7, the other ink tanks 24B, 24C, 24D, and 24E are also configured similarly.

Figure 8:
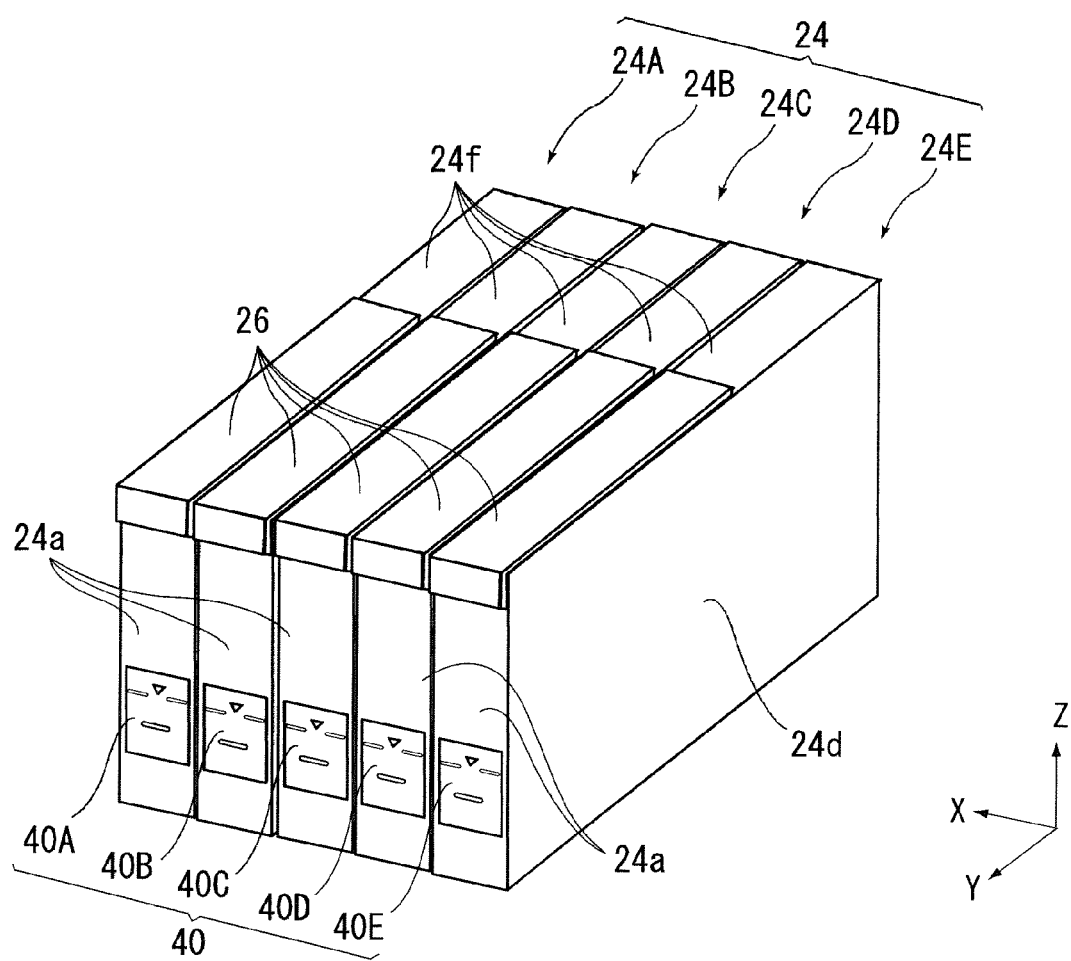
FIG. 8 is a schematic perspective view of the liquid storage unit configured by arranging a plurality of ink tanks.
Figure 9:
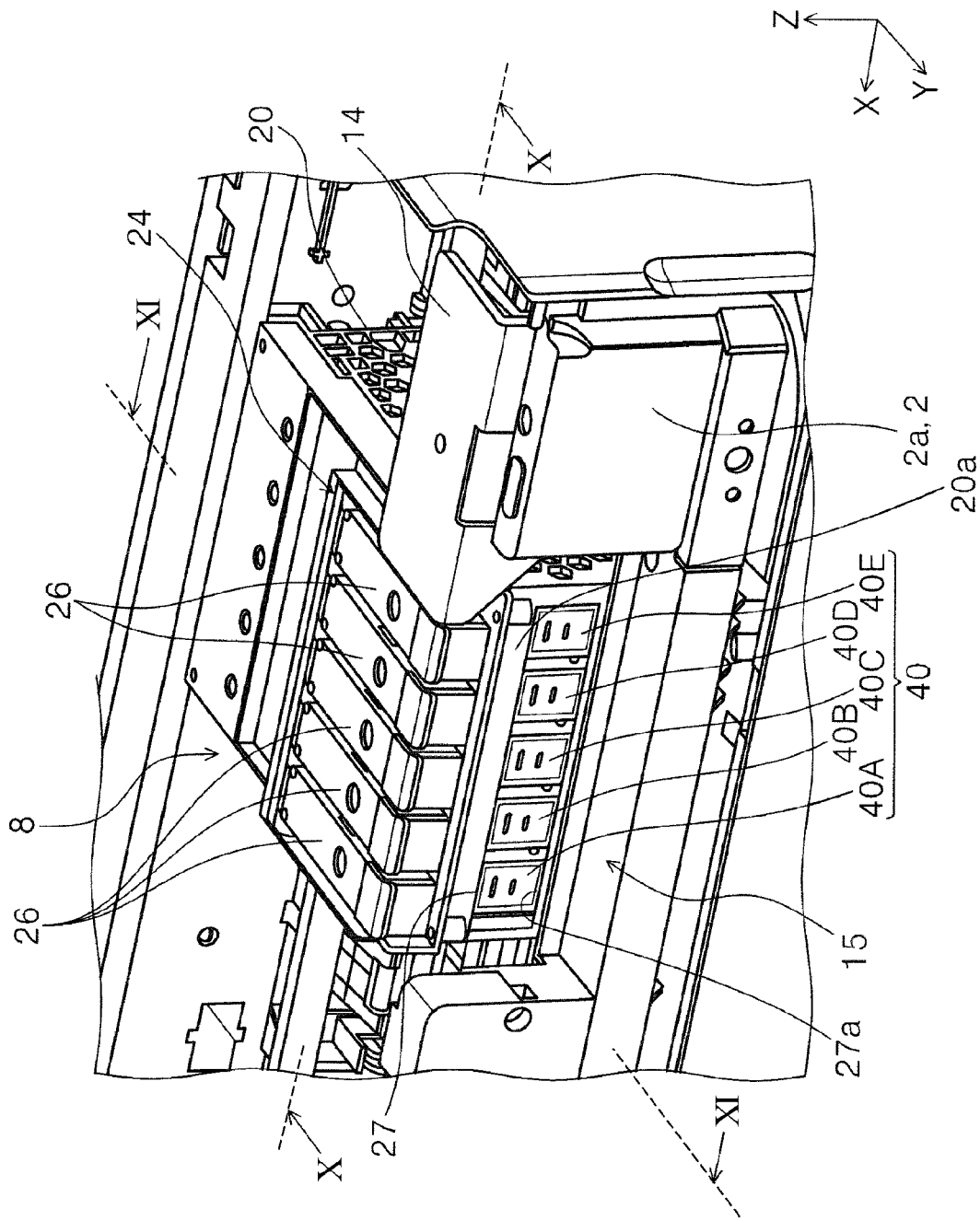
FIG. 9 is a perspective view of the vicinity of the carriage in the printer illustrated in FIG. 4 when viewed from an angle different from that of FIG. 4.

In the liquid storage unit 24, the plurality of ink tanks 24A, 24B, 24C, 24D, and 24E are arranged side by side in the width direction (the X axis direction) as illustrated in FIG. 8, and are stored in the carriage 20 as illustrated in FIG. 9.

The liquid storage unit 24 is provided with a visual recognition unit 40 by which the position of the liquid level in the liquid storage unit 24 can be visually recognized. The ink tanks 24A, 24B, 24C, 24D, and 24E illustrated in FIG. 8 are formed of a light-transmissive material, and visual recognition units 40A, 40B, 40C, 40D, and 40E respectively corresponding to the ink tanks 24A, 24B, 24C, 24D, and 24E are provided on the front surface 24a.

Examples of the light-transmissive material include a light-transmissive resin material. In the present embodiment, the ink tanks 24A, 24B, 24C, 24D, and 24E are made of a light-transmissive white resin material. As the ink tanks 24A, 24B, 24C, 24D, and 24E are formed of a white resin material, the liquid level can be easily visually recognized by contrast with the color of the ink in the ink tanks 24A, 24B, 24C, 24D, and 24E.

A window portion 27 through which the visual recognition unit 40 (the visual recognition units 40A, 40B, 40C, 40D, and 40E) is exposed is provided on a front surface 20a of the carriage 20 illustrated in FIG. 9. A plate-like body that is formed of a material that does not absorb a light beam, such as colorless transparent resin, is fitted in the window portion 27, and the visual recognition unit 40 is viewed through the plate-like body.

Figure 10:
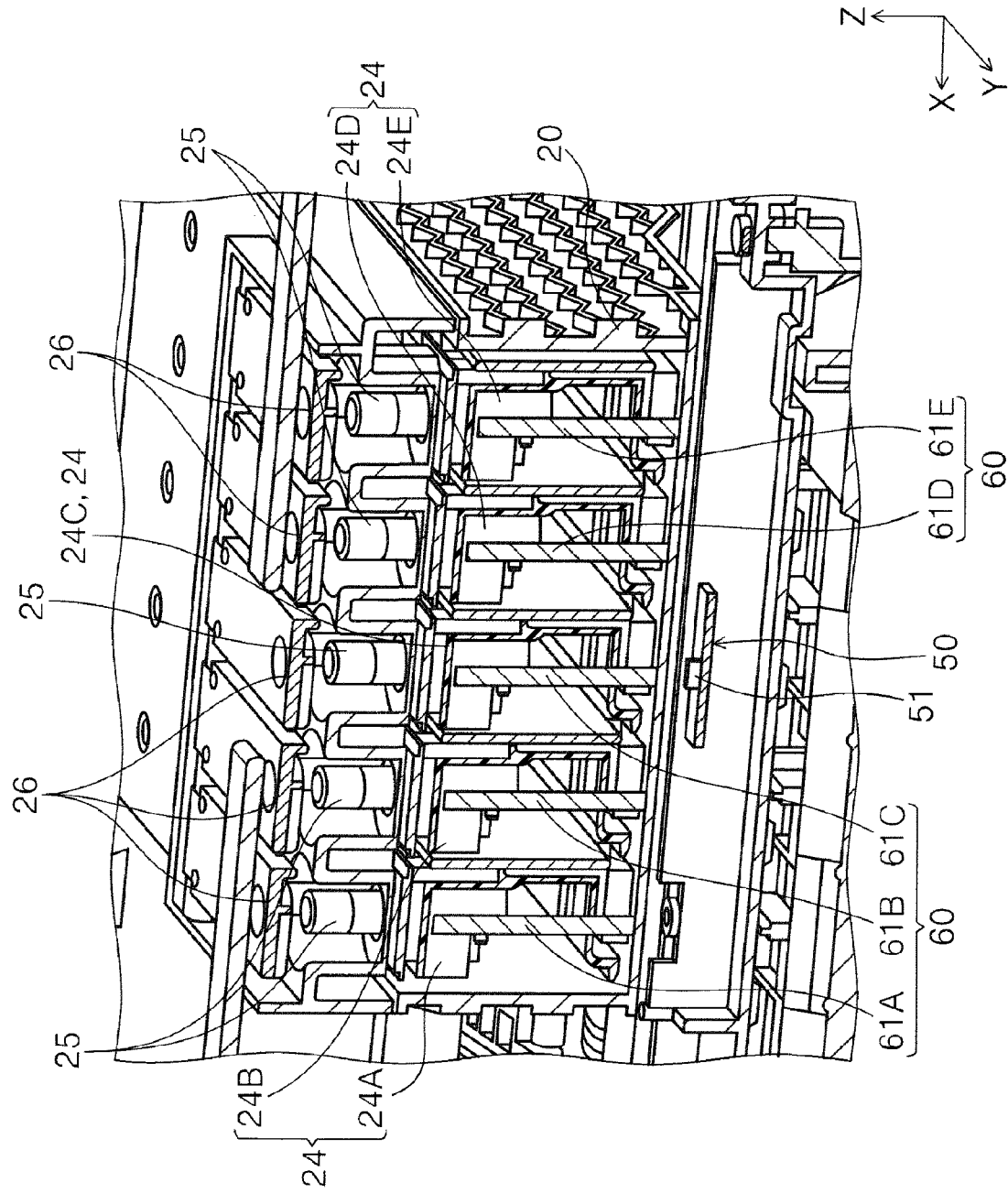
FIG. 10 is a sectional view taken along line X-X of FIG. 9.

Here, as illustrated in FIG. 10, the printer 1 includes an illumination unit 50 that emits a light beam, and a light guide unit 60 that guides the light beam emitted from the illumination unit 50 such that the light beam is applied to the visual recognition unit 40 from the rear side, when a direction which the visual recognition unit 40 faces is set as the front side.

In the present embodiment, the light guide unit 60 illustrated in FIG. 10 includes a plurality of light guide bodies 61A, 61B, 61C, 61D, and 61E provided behind the visual recognition units 40A, 40B, 40C, 40D, and 40E of the ink tanks 24A, 24B, 24C, 24D, and 24E, respectively. That is, the light guide bodies 61A, 61B, 61C, 61D, and 61E are provided in the ink tanks 24A, 24B, 24C, 24D, and 24E, respectively.

Figure 11:
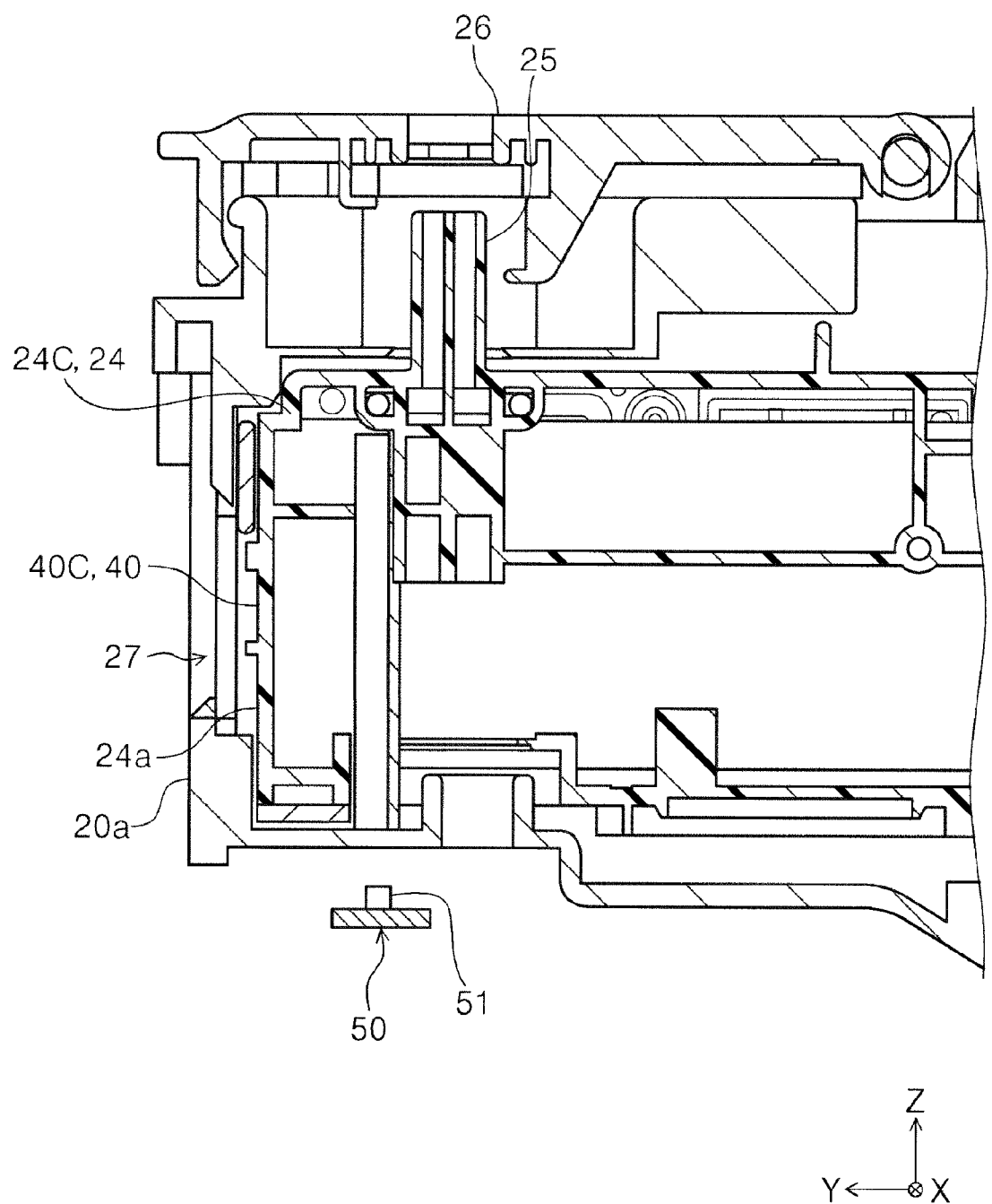
FIG. 11 is a sectional view taken along line XI-XI of FIG. 9.

In the present embodiment, as illustrated in FIGS. 10 and 11, the light guide bodies 61A, 61B, 61C, 61D, and 61E (the light guide unit 60) are provided inside the corresponding ink tanks 24A, 24B, 24C, 24D, and 24E, respectively (see also FIG. 7).

As illustrated in FIG. 10, the illumination unit 50 includes one light source 51, the position of which is fixed inside the housing 2. In the present embodiment, the illumination unit 50 is provided below the liquid storage unit 24 in a vertical direction. As the carriage 20 moves in the width direction, the light beam is introduced from the light source 51 to one of the plurality of light guide bodies 61A, 61B, 61C, 61D, and 61E. As illustrated in FIG. 11, a bottom portion of the carriage 20 is cut out at a portion located between the light guide unit 60 (the light guide body 60C in FIG. 11) and the light source 51, but is formed of a transparent material. Thus, the light beam emitted from the light source 51 can enter the light guide unit 60.

In FIG. 10, the carriage 20 is positioned such that the light source 51 and the light guide body 61C overlap each other in the width direction, the light beam emitted from the light source 51 enters the light guide body 61C, and the rear side of the visual recognition unit 40C is shined.

In this way, as the light beam is introduced to only one of the plurality of light guide bodies 61A, 61B, 61C, 61D, and 61E by the one light source 51, the residual amount of the liquid in one of the ink tanks 24A, 24B, 24C, 24D, and 24E can be stood out and thus can be easily visually recognized.

Further, as in the present embodiment, as the light guide bodies 61A, 61B, 61C, 61D, and 61E are provided inside the ink tanks 24A, 24B, 24C, 24D, and 24E, the light beam is applied from a position closer to the visual recognition unit 40 (the visual recognition units 40A, 40B, 40C, 40D, and 40E). Thus, visibility of the position of the liquid level of the ink in each ink tank can be improved.

As the light beam is applied from the rear side of the visual recognition unit 40, the liquid level of the ink can be clearly seen, and thus visibility of the liquid level in the visual recognition unit 40 can be improved.

The arrangement of the illumination unit 50 is not limited to the lower side of the liquid storage unit 24 in the vertical direction, and as the light guide bodies 61A, 61B, 61C, 61D, and 61E have an L shape or a curved shape, the illumination unit 50 may be provided on the upper side, the lateral side, the rear side, and the front side of the liquid storage unit 24.

Since the light beam can be applied from the rear side of the visual recognition unit 40 via the light guide unit 60, the degree of freedom in designing the arrangement of the illumination unit 50 for obtaining good visibility in the visual recognition unit 40 can be improved.

In FIG. 3, the carriage 20 is located at a home position. The home position is provided at one end of a moving area of the carriage 20, and is set at an end in the −X direction in the present embodiment.

In FIG. 3, when an eaves member 14 is provided on the front side of the housing 2 in the −X direction, and the carriage 20 is located at the home position, the liquid storage unit 24 (the ink tanks 24A, 24B, 24C, 24D, and 24E) in a state in which the cap 26 is closed is located below the eaves member 14. By the eaves member 14, the carriage 20 can be located at the home position in a state in which the cap 26 of the liquid storage unit 24 is certainly closed.

Since the eaves member 14 exists, the cap 26 of the liquid storage unit 24 cannot be opened when the carriage 20 is located at the home position illustrated in FIG. 3. When the liquid storage unit 24 is replenished with the ink, for example, an ink replenishment mode is selected in the manipulation unit 6, so that the carriage 20 can be moved to a position where the cap 26 is not covered by the eaves member 14 as illustrated in FIGS. 4 and 9.

As described above, the notch portion 15 is provided on the front surface 2a of the housing 2 illustrated in FIG. 3. The notch portion 15 is provided at a position shifted from the eaves member 14 in the width direction, and a position where the carriage 20 overlaps the notch portion 15 in the width direction is set as a stop position of the carriage 20 in the ink replenishment mode. Accordingly, the ink can be replenished while the amount of the ink in the liquid storage unit 24 is identified by the visual recognition unit 40.

Hereinafter, the stop position of the carriage 20 in the ink replenishment mode illustrated in FIG. 9 may be referred to as an ink replenishment position. In the ink replenishment mode, it is possible to select which ink tank 24A, 24B, 24C, 24D, and 24E is replenished with the ink, and the carriage 20 is stopped such that the selected ink tank is located at a position corresponding to the illumination unit 50.

When the replenishment of the ink is completed, for example, the ink replenishment mode is terminated in the manipulation unit 6, so that the carriage 20 can return from the ink replenishment position to the home position. Further, it is detected that the scanner unit 4 is closed with respect to the housing 2, and the carriage 20 returns to the home position using the detection result as a trigger.

In the present embodiment, the illumination unit 50 can be configured to be turned off in a closed state in which the scanner unit 4 is closed with respect to the housing 2 and turned on when the scanner unit 4 is opened from the closed state.

Such a configuration can be realized, for example, by providing a lighting circuit that forms a closed circuit when the scanner unit 4 is opened. Alternatively, the configuration can be realized by providing a detection unit that detects opening and closing of the scanner unit 4 and by causing a control unit that is not illustrated to turn on the illumination unit 50 based on a detection signal of the detection unit.

Accordingly, for example, when the scanner unit 4 is opened to replenish the ink, the residual amount of the ink can be easily visually recognized.

Figure 12:
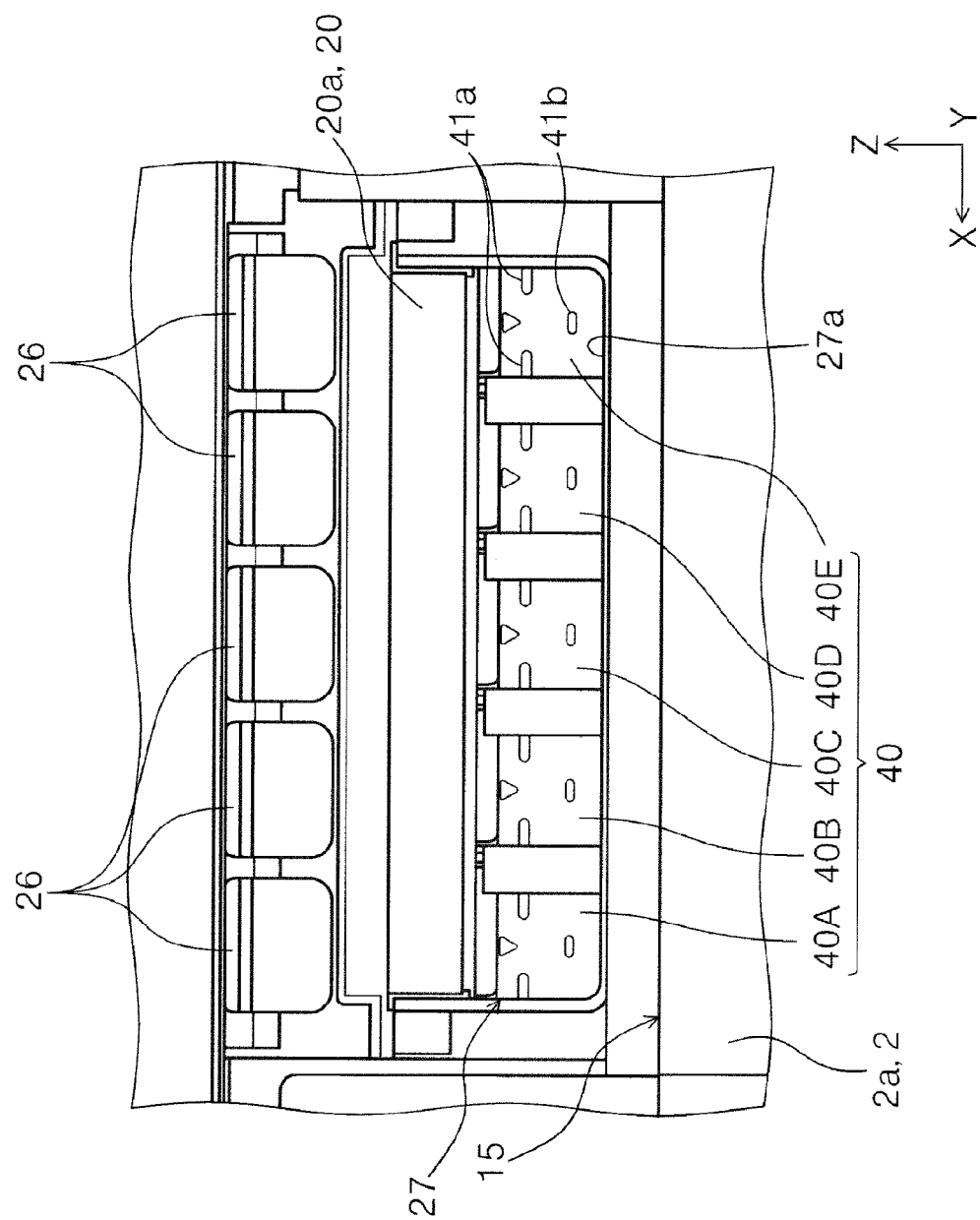
FIG. 12 is a front view of FIG. 9.

As illustrated in FIG. 12, a first scale portion 41a and a second scale portion 41b serving as references for the amount of the ink stored in each of the ink tanks 24A, 24B, 24C, 24D, and 24E are provided in each of the visual recognition units 40A, 40B, 40C, 40D, and 40E.

The first scale portion 41a corresponds to a liquid level position when the maximum amount of the ink that can be stored in the ink tanks 24A, 24B, 24C, 24D, and 24E is replenished. The second scale portion 41b corresponds to a liquid level position when a half of the maximum amount of the ink is replenished.

When the amount of the ink in the ink tanks 24A, 24B, 24C, 24D, and 24E is smaller than a half of the maximum amount of the ink, and thus the liquid level is located below a lower edge 27a of the rectangular window portion 27 (see also FIG. 9) formed on the front surface 20a of the carriage 20, the liquid level is invisible in the visual recognition unit 40. By identifying the position of the liquid level in the visual recognition unit 40, it is possible to determine whether or not to replenish the ink or to determine whether or not the replenishment is completed when the ink is replenished.

Further, as illustrated in FIG. 2, the amount of the ink in the liquid storage unit 24 can also be identified by tilting the panel unit 13 to the second posture in a state in which the scanner unit 4 is closed.

When the amount of the ink in the liquid storage unit 24 is identified in a state in which the scanner unit 4 is closed, for example, an ink amount identification mode is selected in the manipulation unit 6, so that the carriage 20 can be moved to a position overlapping the notch portion 15 in the width direction.

Figure 15:
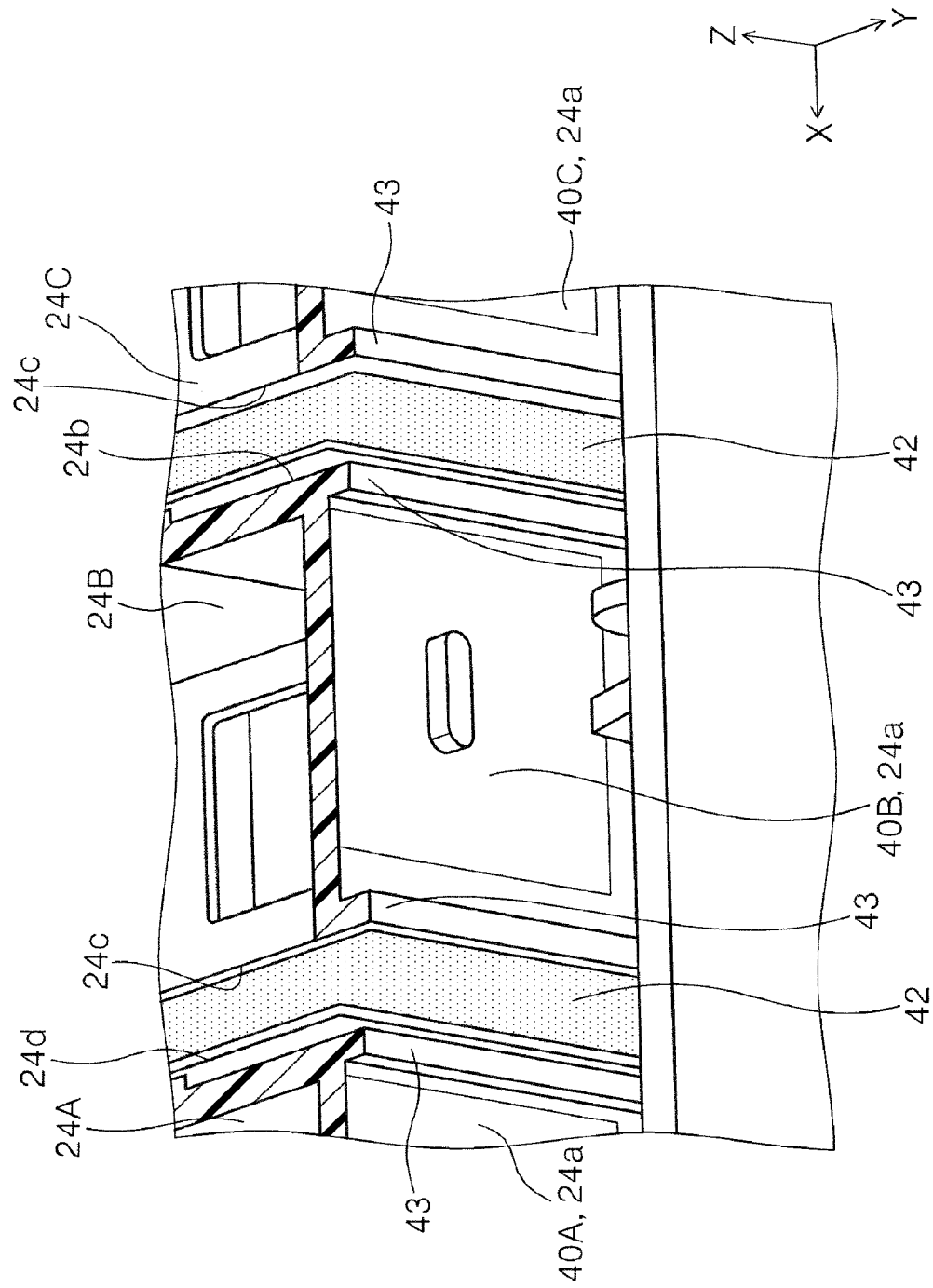
FIG. 15 is a perspective view of a horizontal cross-section of the liquid storage unit.

As illustrated in FIG. 15, film members 42 are provided between a side surface 24d of the ink tank 24A in the −X direction and a side surface 24c of the ink tank 24B in the +X direction and between a side surface 24d of the ink tank 24B in the −X direction and a side surface 24c of the ink tank 24C in the +X direction. The film members 42 are welding films as an example, and the ink tank 24A and the ink tank 24B, and the ink tank 24B and the ink tank 24C are integrated through the film members 42.

The film members 42 provided not only on both sides of the ink tank 24B in the width direction but also between the respective ink tanks.

Hereinafter, the ink tank 24B will be described as an example. Ribs 43 standing up with respect to a front surface 24a are provided on both sides of the front surface 24a of the ink tank 24B in the width direction. That is, the ribs 43 protrude from the front surface 24a in the +Y direction. The ribs 43 are also provided on the other ink tanks 24A, 24C, 24D, and 24E.

As the ribs 43 and 43 are provided, the film member 42 is sandwiched between the ribs 43, so that the film member 42 can be protected and peeling of the film member 42 can be suppressed.

Other Configurations in Printer

In the present embodiment, the illumination unit 50 can be turned off when the panel unit 13 is in the first posture illustrated in FIG. 1, and can be turned on when the panel unit 13 is tilted from the first posture to the second posture illustrated in FIG. 2.

The illumination unit 50 is turned on when the panel unit 13 is tilted from the first posture to the second posture illustrated in FIG. 2, so that when the panel unit 13 is tilted to identify the residual amount of the ink, the residual amount of the ink in the visual recognition unit 40 can be easily identified. Further, the illumination unit 50 is turned off when the panel unit 13 is in the first posture, so that power consumption can be suppressed.

Such a configuration can be realized, for example, by providing a lighting circuit that forms a closed circuit when the panel unit 13 is tilted from the first posture. Alternatively, the configuration can be realized by providing a detection unit that detects opening and closing of the panel unit 13 and by causing a control unit that is not illustrated to turn on the illumination unit 50 based on a detection signal of the detection unit.

Figure 13:
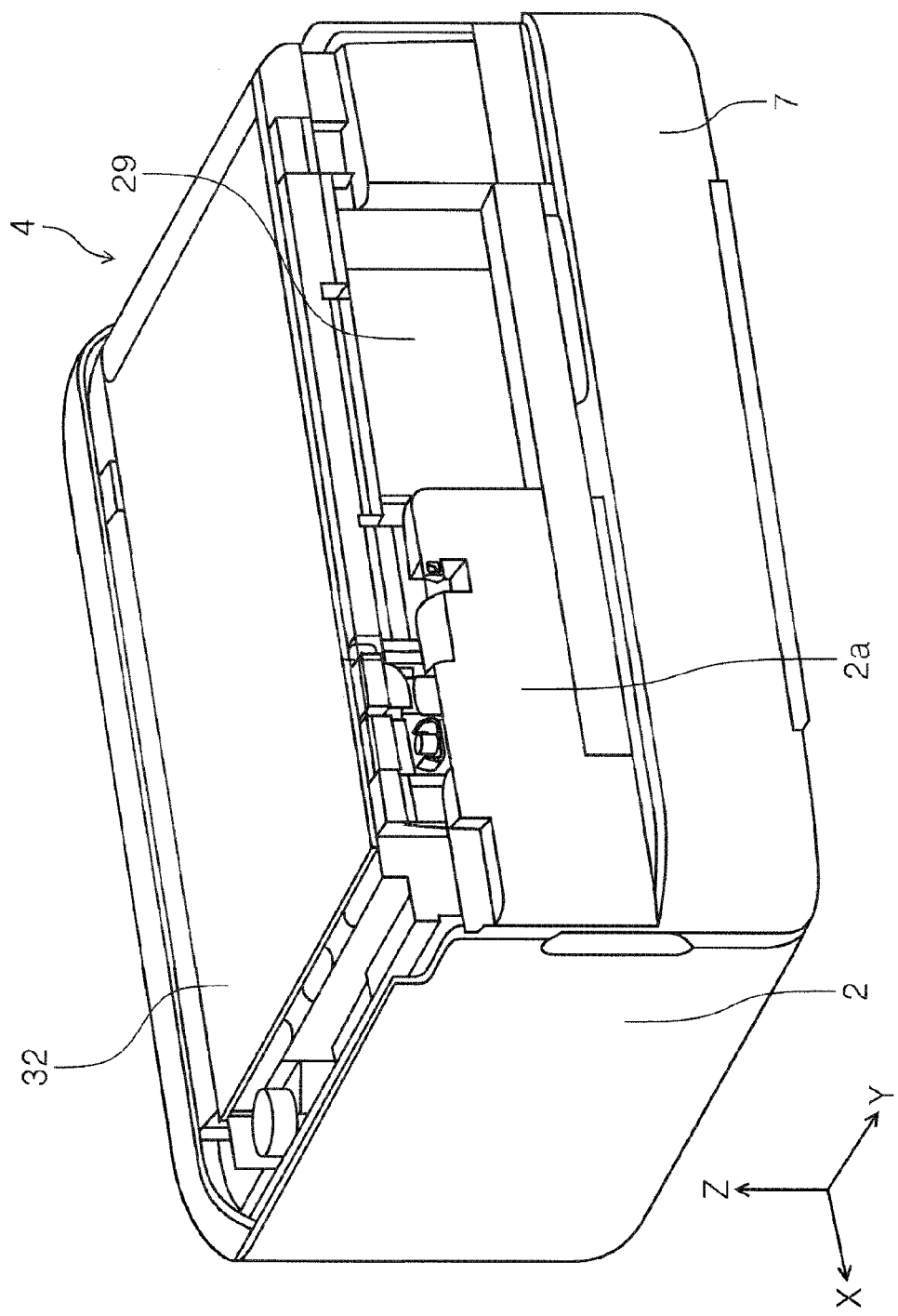
FIG. 13 is a perspective view illustrating a state in which the document stand cover, a frame member, and a panel unit are removed from the printer according to the first embodiment.
Figure 14:
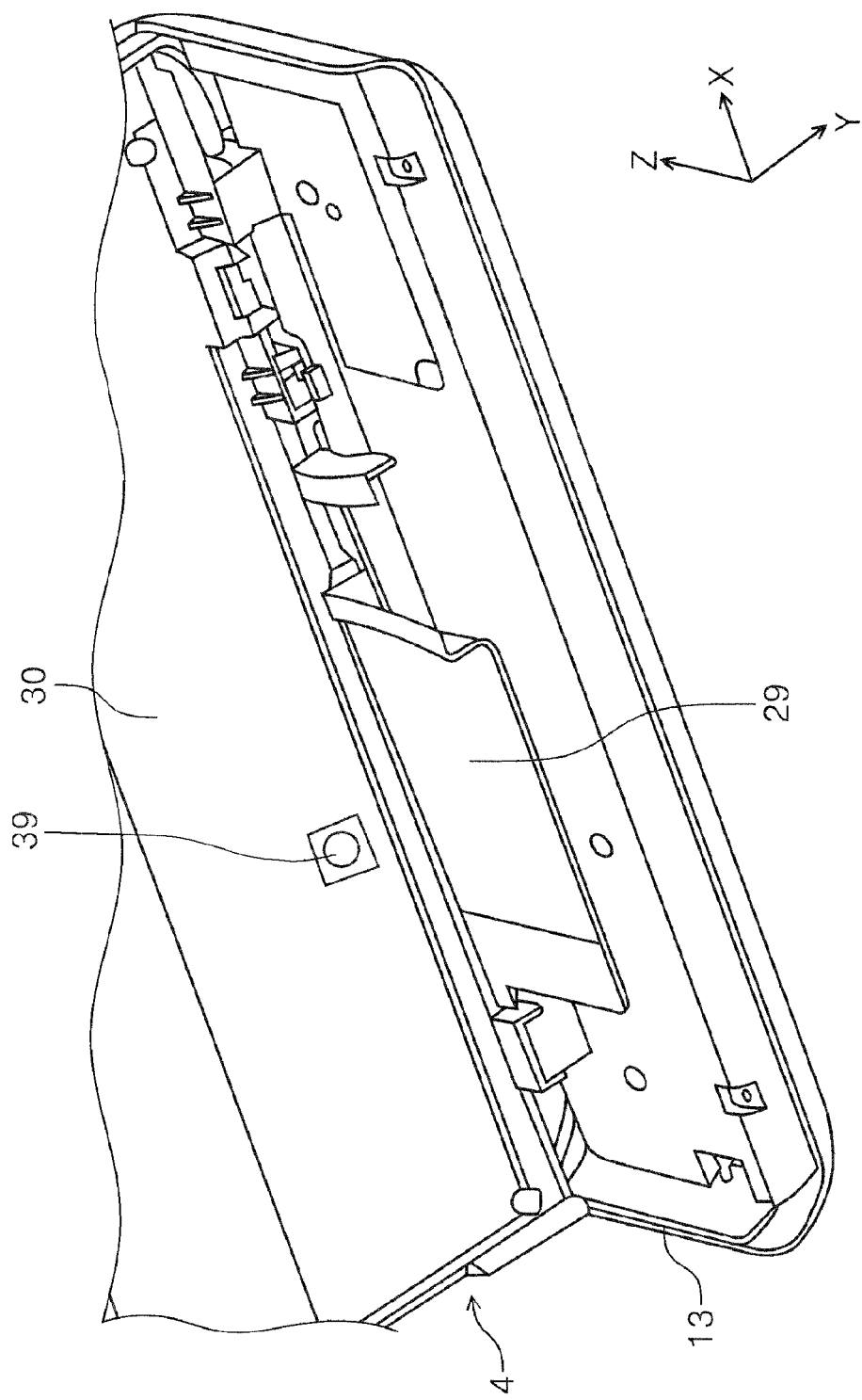
FIG. 14 is a perspective view of the scanner unit and the panel unit when viewed from the lower side.

In the present embodiment, the scanner unit 4 can be provided with a cover member 29 that closes the notch portion 15 in the closed state of the scanner unit 4 as illustrated in FIG. 13. FIG. 13 illustrates a state in which the frame member 38, the document stand cover 5, and the panel unit 13 are removed from the printer 1. As illustrated in FIG. 14, the cover member 29 is provided in the scanner unit 4 to be located on the rear side (the −Y direction) of the panel unit 13.

As the cover member 29 is provided, the notch portion 15 is covered with the cover member 29 in the closed state of the scanner unit 4, so that ink mist generated when the recording is performed in the printer 1 can be suppressed from adhering to the rear surface of the panel unit 13.

In the present embodiment, the cover member 29 is formed of a colorless transparent material, and the residual amount of the ink can be identified by tilting the panel unit 13 while the scanner unit 4 is closed. The cover member 29 may be colored transparent or semitransparent as long as the liquid level in the visual recognition unit 40 can be identified through the cover member 29.

Further, when the cover member 29 is formed of an opaque material, the ink amount identification mode selected by the manipulation unit 6 can be omitted.

As illustrated in FIG. 14, a lamp 39 can be provided on the rear side of the scanner unit 4. The lamp 39 can be configured to be turned off in a closed state in which the scanner unit 4 is closed with respect to the housing 2 and turned on when the scanner unit 4 is opened from the closed state. Since the lamp 39 is turned on when the scanner unit 4 is opened, a hand becomes brighter when the liquid storage unit 24 is replenished with the ink or maintenance of the housing 2 is performed, so that workability is improved.

Such a configuration can be realized, for example, by providing a lighting circuit that forms a closed circuit when the scanner unit 4 is opened. Alternatively, the configuration can be realized by providing a detection unit that detects opening and closing of the scanner unit 4 and by causing a control unit that is not illustrated to turn on the lamp 39 based on a detection signal of the detection unit.

Figure 16:
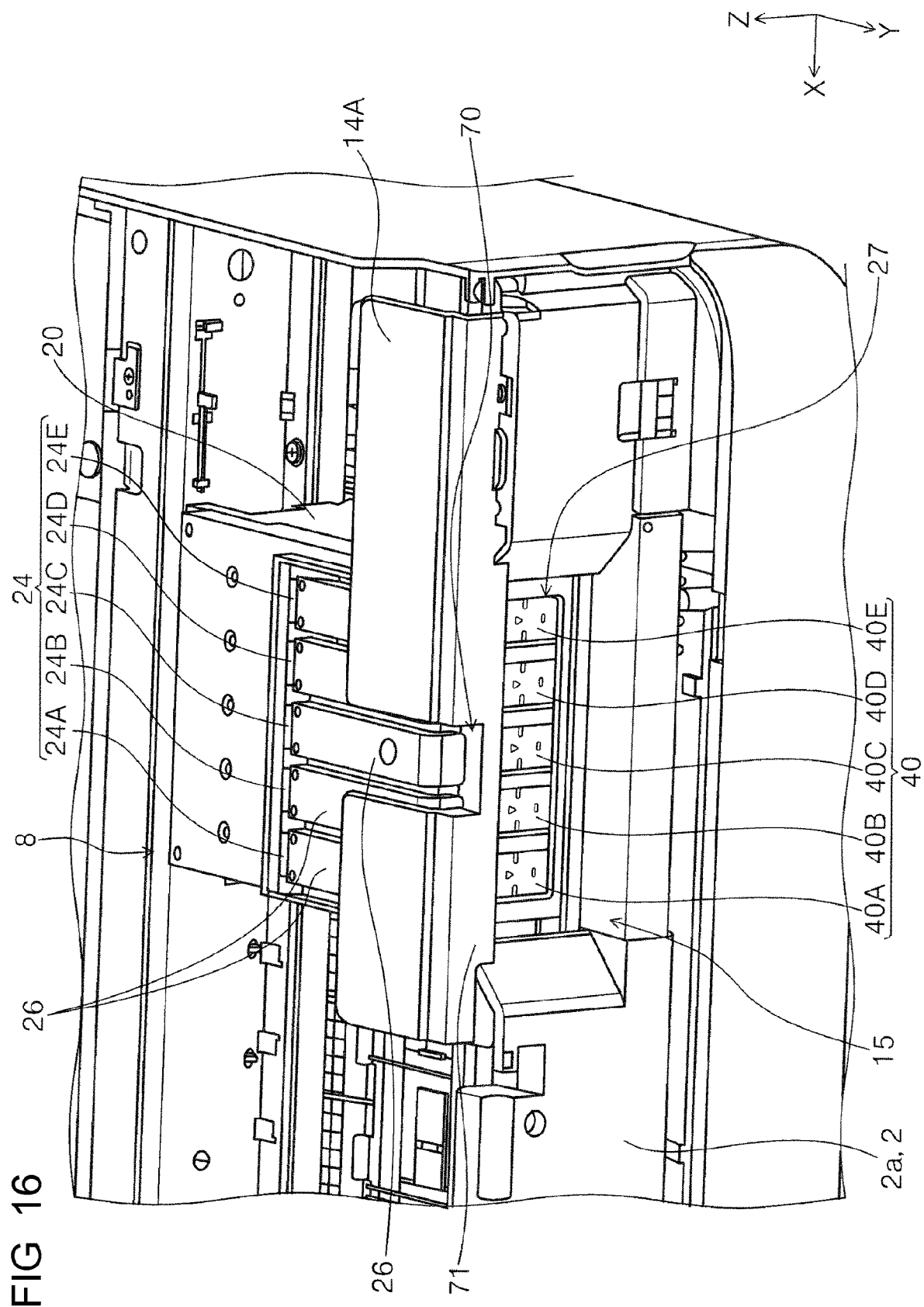
FIG. 16 is a perspective view for illustrating another example of an eaves member.

Further, FIG. 16 illustrates an eaves member 14A that is a modification example of the eaves member 14. The eaves member 14A extends in the width direction (the X axis direction) not only to the home position of the carriage 20 but also to the ink replenishment position to the liquid storage unit 24. The eaves member 14A includes an attachment surface 71 along the front surface 2a of the housing 2, the attachment surface 71 is attached to the inner side of the front surface 2a, and the eaves member 14A is fixed to the housing 2.

The eaves member 14A is formed with a gap portion 70 by which the cap 26 of one of the ink tanks 24A, 24B, 24C, 24D, and 24E is exposed to be openable and closeable. With this configuration, only the cap 26 exposed from the gap portion 70 can be opened and closed. In FIG. 16, the cap 26 of the ink tank 24C is exposed from the gap portion 70, and only the cap 26 of the ink tank 24C can be opened and closed.

The gap portion 70 is formed at a position overlapping the illumination unit 50 illustrated in FIG. 10 in the width direction. Accordingly, the light guide body 61C of the ink tank 24C to be replenished with the ink by opening and closing the cap 26 can be illuminated.

Figure 17:
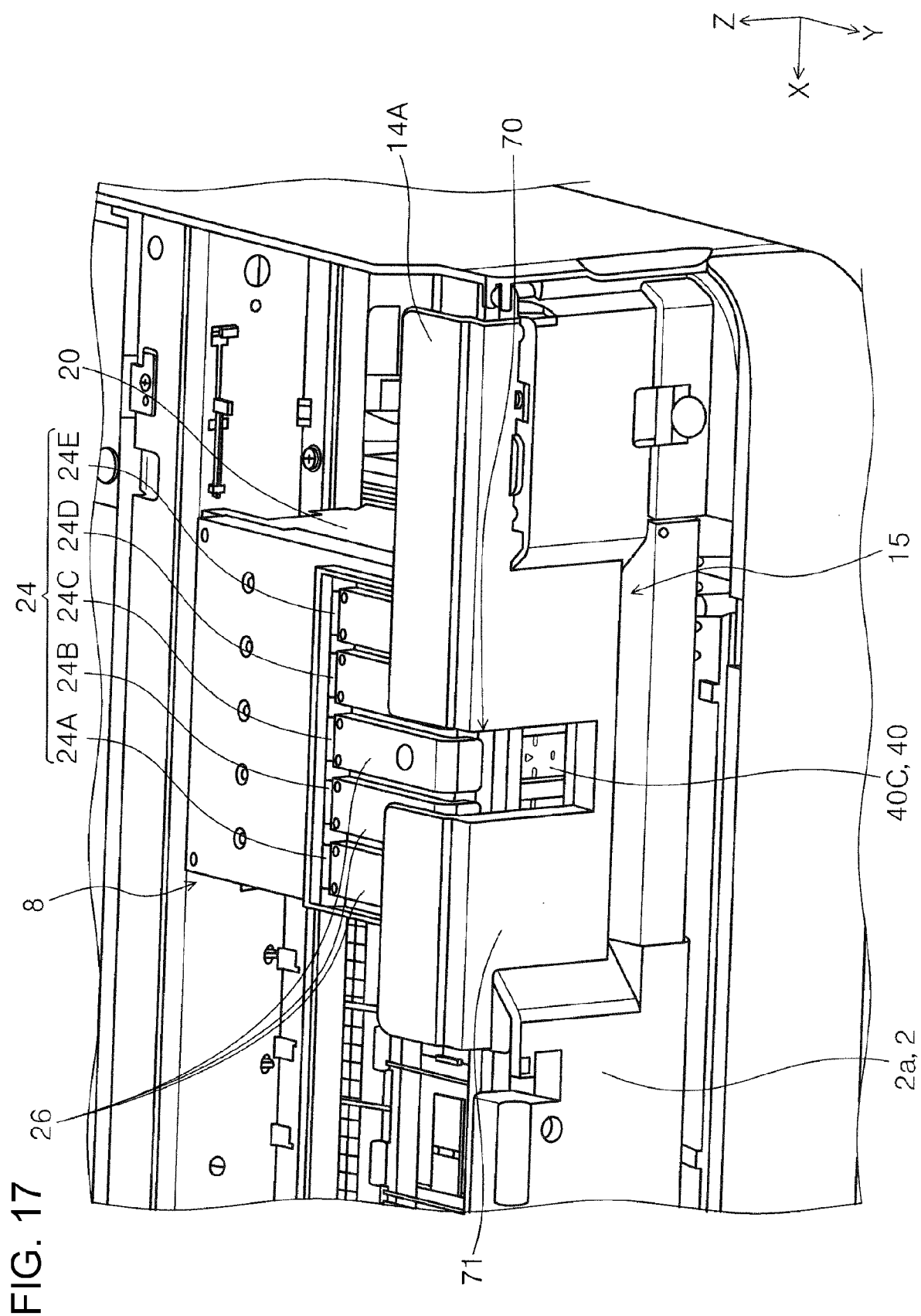
FIG. 17 is a perspective view for illustrating yet another example of the eaves member.

Further, in FIG. 16, a lower end of the attachment surface 71 is located on the visual recognition unit 40, and the plurality of visual recognition units 40A, 40B, 40C, 40D, and 40E are not covered by the attachment surface 71. However, as illustrated in FIG. 17, the attachment surface 71 extends downward to be located below the visual recognition unit 40, and the gap portion 70 also extends downward, so that only the visual recognition unit 40C of the ink tank 24C in which the cap 26 can be opened and closed can be exposed from the gap portion 70.

Second Embodiment

Hereinafter, a second embodiment will be described with reference to FIGS. 18 and 19. Further, in the embodiment described below, the same components as those according to the first embodiment are designated by the same reference numerals as those according to the first embodiment, and description thereof will be omitted.

Although not illustrated, the liquid storage unit 24 of the second embodiment includes the ink tanks 24A, 24B, 24C, 24D, and 24E, which is like the first embodiment illustrated in FIG. 8.

Since the ink tanks 24A, 24B, 24C, 24D, and 24E have the same configuration, in FIGS. 18 and 19, the ink tank 24A will be described as an example.

Figure 18:
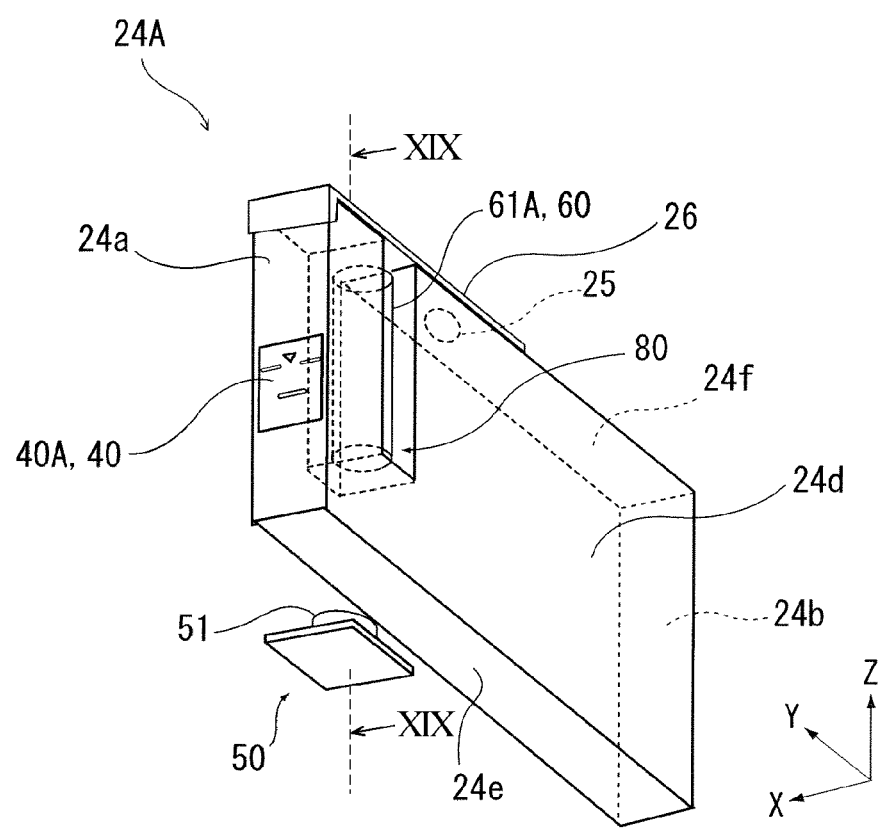
FIG. 18 is a diagram for illustrating a second embodiment.
Figure 19:
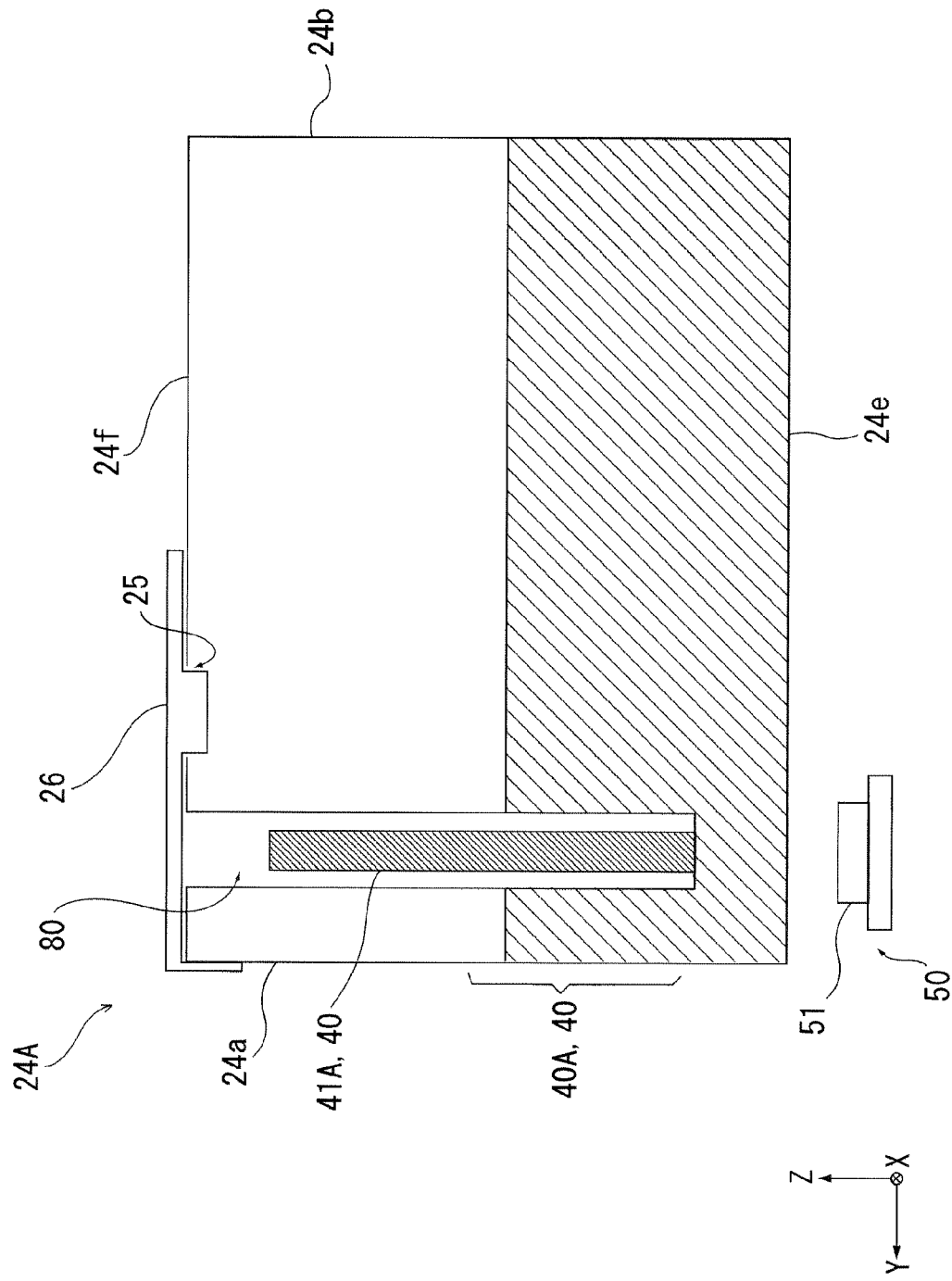
FIG. 19 is a sectional view taken along line XIX-XIX of FIG. 18.

As illustrated in FIGS. 18 and 19, the ink tank 24A includes a slit 80 in which the light guide body 61A as a light guide unit 60 can be disposed between the front surface 24a and the rear surface 24b. The light guide body 61A is disposed in the slit 80. That is, in the present embodiment, the light guide body 61A (the light guide unit 60) is disposed outside the ink tank 24A.

Further, when the light guide body 61A (the light guide unit 60) is disposed outside the ink tank 24A, the light guide body 61A can be disposed on the rear side (in the −Y direction) of the rear surface 24b of the ink tank 24A illustrated in FIGS. 18 and 19. However, as in the present embodiment, as the light guide body 61A is disposed in the slit 80 formed in the ink tank 24A, the light beam can be emitted from a position closer to the visual recognition unit 40A than when the light beam is applied from the rear side of the rear surface 24b of the ink tank 24A toward the visual recognition unit 40A. Thus, visibility of the position of the liquid level of the ink in the ink tank 24A can be improved.

Third Embodiment

Figure 20:
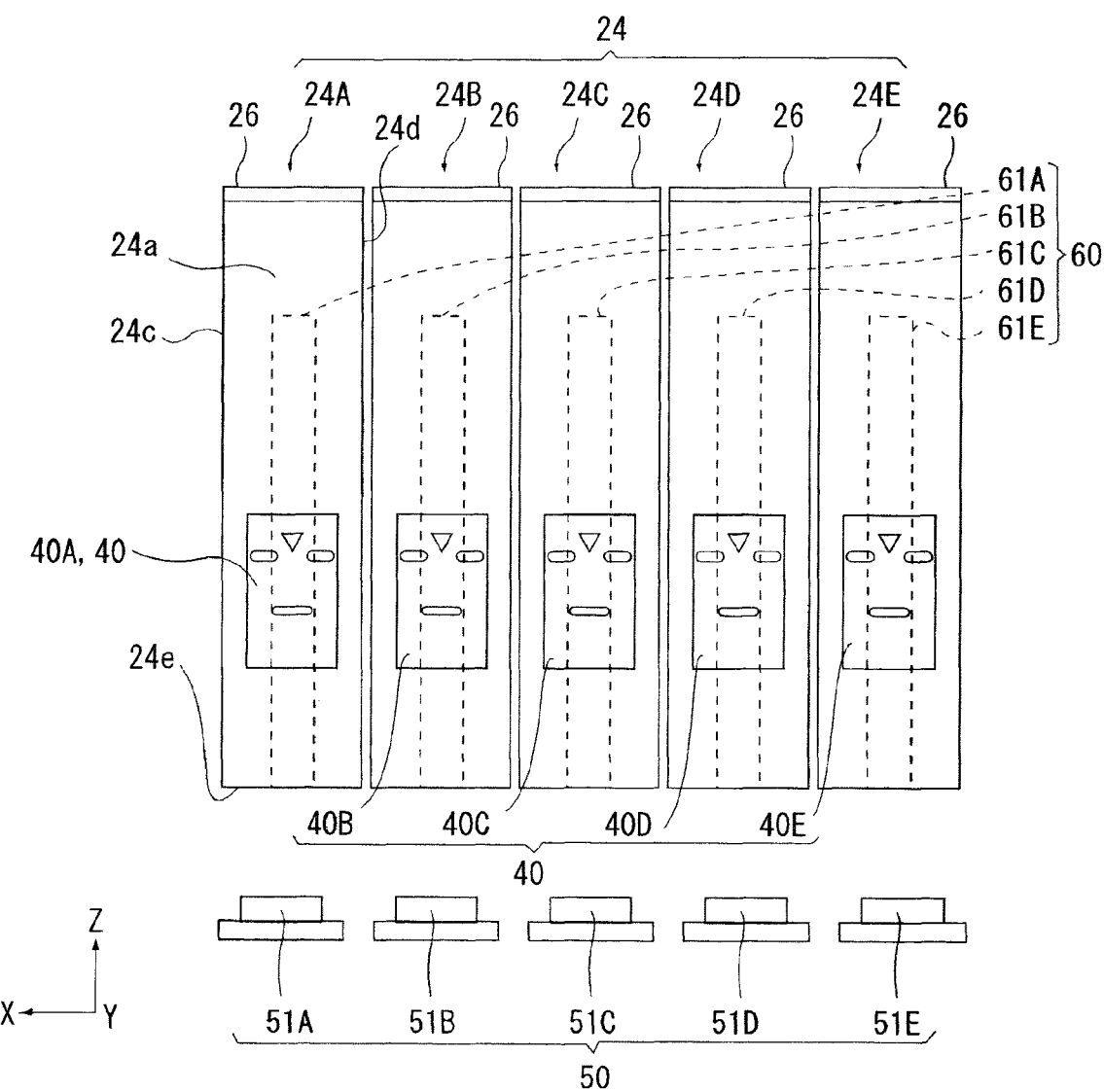
FIG. 20 is a diagram for illustrating a third embodiment.

Hereinafter, a third embodiment will be described with reference to FIG. 20.

Similar to the first embodiment illustrated in FIG. 8, the third embodiment has the same configuration as that of the first embodiment in that the liquid storage unit 24 includes the plurality of ink tanks 24A, 24B, 24C, 24D, and 24E, and the light guide unit 60 is provided which includes the plurality of light guide bodies 61A, 61B, 61C, 61D, and 61E provided behind the visual recognition units 40A, 40B, 40C, 40D, and 40E of the ink tanks 24A, 24B, 24C, 24D, and 24E, respectively. As illustrated in FIG. 20, the illumination unit 50 of the third embodiment includes a plurality of light sources 51A, 51B, 51C, 51D, and 51E for introducing the light beams to the plurality of light guide bodies, respectively.

Since the individual light sources 51A, 51B, 51C, 51D, and 51E and the light guide bodies 61A, 61B, 61C, 61D, and 61E are provided in the plurality of ink tanks 24A, 24B, 24C, 24D, and 24E, respectively, for example, the light beam is applied only to the ink tank in which the replenishment of the ink is required, and thus the residual amount of the ink can be easily visually recognized. Further, after the carriage 20 is moved to the ink replenishment position, the light beams can be introduced into all the light guide bodies 61A, 61B, 61C, 61D, and 61E without moving the carriage 20.

Fourth Embodiment

Hereinafter, a fourth embodiment will be described mainly with reference to FIGS. 21 and 22.

Similar to the liquid storage unit 24 of the first embodiment illustrated in FIG. 8, in the fourth embodiment, the liquid storage unit 24 includes the plurality of ink tanks 24A, 24B, 24C, 24D, and 24E as a plurality of liquid tanks arranged side by side in the width direction (the X axis direction). The plurality of ink tanks 24A, 24B, 24C, 24D, and 24E have the slits 80 (see FIG. 22) that are similar to that of the ink tank 24A described with reference to FIGS. 18 and 19 in the second embodiment.

In the present embodiment, the illumination unit 50 includes one light source 51. As an example, when the carriage 20 is stopped in the ink replenishment position illustrated in FIG. 9, the light source 51 is located on a lateral side of the liquid storage unit 24 in the −X direction.

Figure 21:
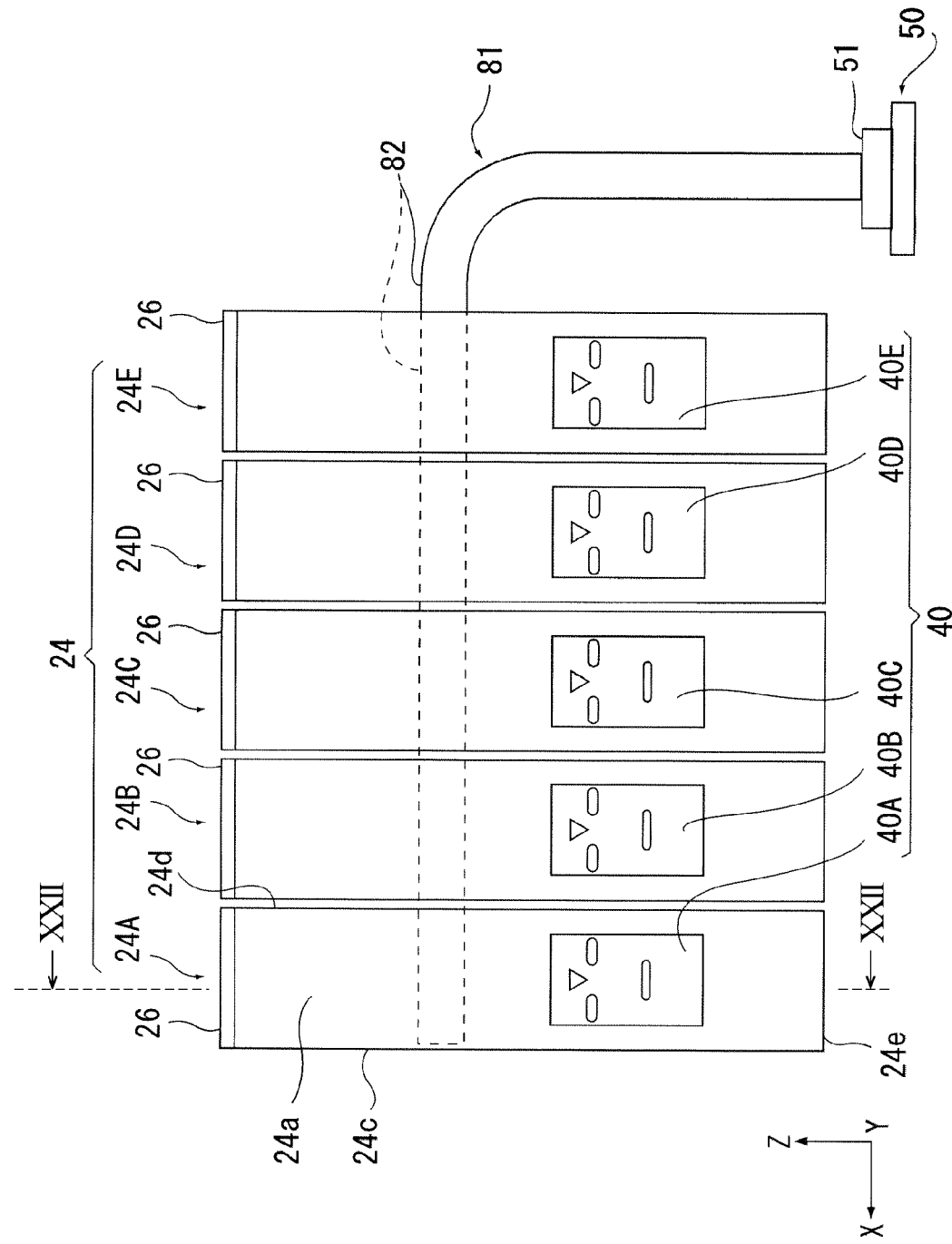
FIG. 21 is a diagram for illustrating a fourth embodiment.

In the present embodiment, a light guide unit 81 includes one light guide body 82 that guides a light beam emitted from one light source 51 as illustrated in FIG. 21, and the light guide body 82 is disposed to overlap the plurality of ink tanks 24A, 24B, 24C, 24D, and 24E in the width direction. In the present embodiment, the light guide body 82 is formed in an L-shaped curved shape.

With the above configuration, the light beam can be simultaneously applied to the plurality of ink tanks 24A, 24B, 24C, 24D, and 24E by the one light source and the one light guide body 82.

Figure 22:
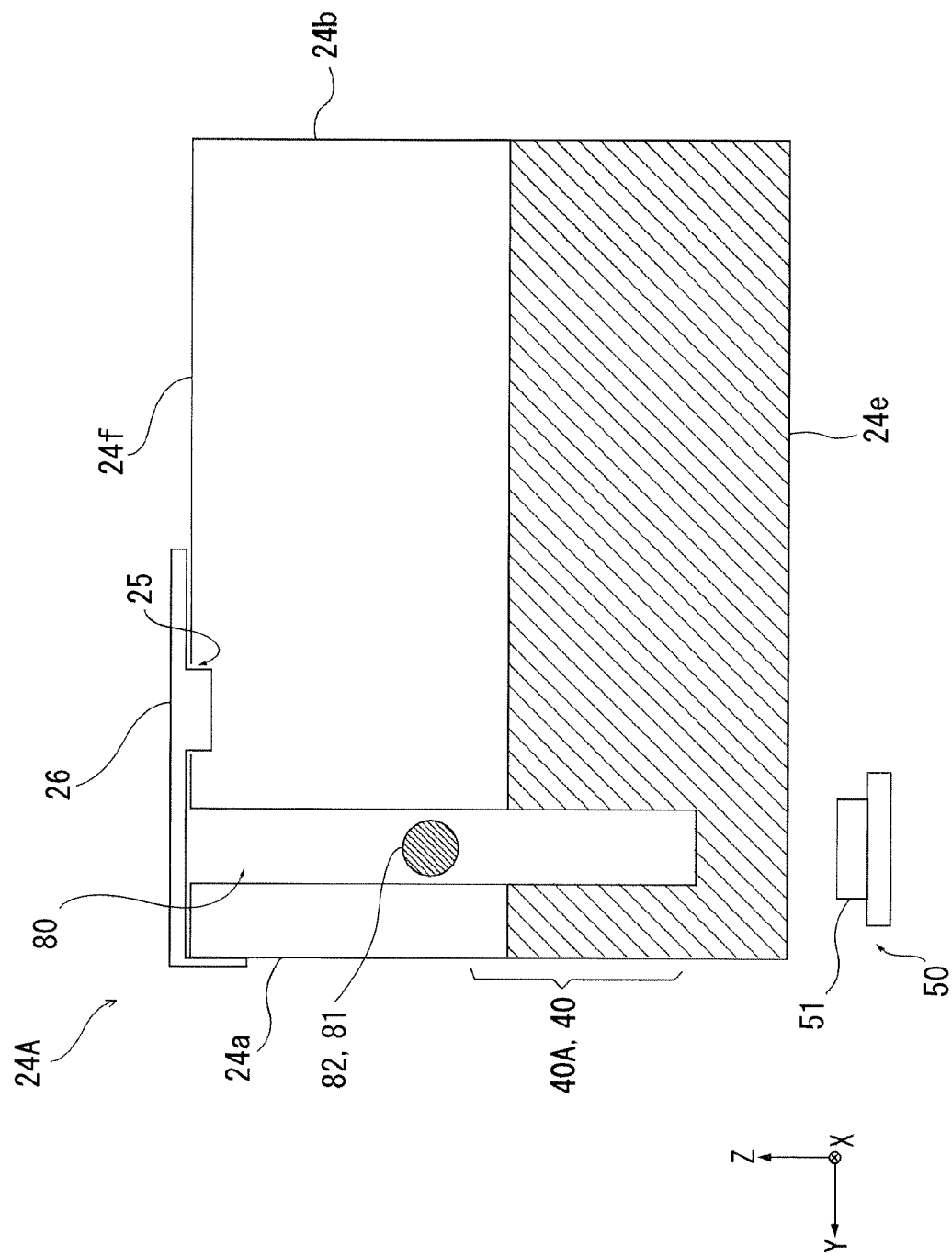
FIG. 22 is a sectional view taken along line XXII-XXII of FIG. 21.

Further, in the present embodiment, the light guide body 82 (the light guide unit 81) is disposed in the slit 80 as illustrated in FIG. 22. However, the light guide body 82 may be disposed to overlap the rear sides of the rear surfaces 24b of the plurality of ink tanks 24A, 24B, 24C, 24D, and 24E not including the slit 80 in the width direction.

Further, the illumination unit 50 may be provided in another carriage 20 inside the housing 2, which can be provided at a position facing a lower end of the light guide body 82 when the carriage 20 is located at an ink replenishable position.

Further, in the present embodiment, the plurality of ink tanks 24A, 24B, 24C, 24D, and 24E are provided as the liquid storage unit 24. However, for example, in the case of a so-called monochrome printer that performs recording only in black, the liquid storage unit 24 can be formed with one ink tank.

Further, it is apparent that the present disclosure is not limited to the above-described embodiments, various modifications can be made without departing from the scope of the present disclosure described in the appended claims, and the modifications are also included in the scope of the present disclosure.

What is claimed is:

1. A recording apparatus comprising:
   a recording head that performs recording by ejecting a liquid to a transported medium;
   a carriage that includes the recording head and is configured to move in a width direction intersecting a medium transport direction;
   a liquid storage unit that stores the liquid supplied to the recording head, is mounted on the carriage, includes a filling port configured such that the liquid is filled therethrough, and is formed of a light-transmissive material;
   a visual recognition unit that is provided in the liquid storage unit and is configured to visually recognize a position of a liquid level in the liquid storage unit;
   an illumination unit that emits a light beam; and
   a light guide unit that guides the light beam emitted from the illumination unit such that the light beam is applied to the visual recognition unit from a rear side, when the visual recognition unit faces a front side.

2. The recording apparatus according to claim 1, wherein the illumination unit is provided vertically below the liquid storage unit.

3. The recording apparatus according to claim 1, wherein the illumination unit is provided on a lateral side of the liquid storage unit in the width direction.

4. The recording apparatus according to claim 1, wherein the liquid storage unit includes a plurality of liquid tanks including a front surface, a rear surface, side surfaces, a bottom surface, and a top surface,
   the light guide unit includes a plurality of light guide bodies provided behind the visual recognition units of the plurality of liquid tanks, respectively, and
   the illumination unit includes a plurality of light sources that introduce the light beam to the plurality of light guide bodies, respectively.

5. The recording apparatus according to claim 1, wherein the liquid storage unit includes a plurality of liquid tanks including a front surface, a rear surface, side surfaces, a bottom surface, and a top surface,
   the light guide unit includes a plurality of light guide bodies provided behind the visual recognition units of the plurality of liquid tanks, respectively,
   the illumination unit includes one light source of which a position is fixed, and
   the carriage is moved in the width direction so that the light beam is introduced from the one light source to one of the plurality of light guide bodies.

6. The recording apparatus according to claim 1, wherein the liquid storage unit includes a front surface, a rear surface, side surfaces, a bottom surface, and a top surface, and includes a plurality of liquid tanks arranged side by side in the width direction,
   the illumination unit includes one light source,
   the light guide unit includes one light guide body that guides the light beam emitted from the one light source, and
   the light guide body is disposed to overlap the plurality of liquid tanks in the width direction.

7. The recording apparatus according to claim 4, wherein the plurality of liquid tanks include slits configured such that the light guide unit is disposed between the front surface and the rear surface.

8. The recording apparatus according to claim 4, wherein the light guide unit is provided inside the liquid tank.

9. The recording apparatus according to claim 1, further comprising:
   a housing including a movement area of the carriage therein; and
   a scanner unit that includes a document stand on which a document is placed and a reading unit that reads the document placed on the document stand, is provided to be rotatable with respect to the housing, and is configured to open and close an upper portion of the housing through rotation, wherein
   the illumination unit is turned off when the scanner unit is in a closed state in which the scanner unit is closed with respect to the housing and is turned on when the scanner unit is opened from the closed state.

10. The recording apparatus according to claim 9, further comprising:
    a panel unit that is provided in the scanner unit and is configured to be tilted between a first posture and a second posture in which the panel unit is more parallel to the document stand than the first posture, wherein
    the illumination unit is turned off when the panel unit is in the first posture and is turned on when the panel unit is tilted from the first posture to the second posture.

11. The recording apparatus according to claim 9, wherein in a state in which the scanner unit is opened, the liquid storage unit is configured to be replenished with the liquid.

* * * * *